US007143361B2

(12) United States Patent
Ramchandani

(10) Patent No.: US 7,143,361 B2
(45) Date of Patent: Nov. 28, 2006

(54) OPERATOR INTERFACE CONTROLS FOR CREATING A RUN-TIME OPERATOR INTERFACE APPLICATION FOR A TEST EXECUTIVE SEQUENCE

(75) Inventor: Mahesh A. Ramchandani, Round Rock, TX (US)

(73) Assignee: National Instruments Corporation, Austin, TX (US)

( * ) Notice: Subject to any disclaimer, the term of this patent is extended or adjusted under 35 U.S.C. 154(b) by 807 days.

(21) Appl. No.: 10/320,036

(22) Filed: Dec. 16, 2002

(65) Prior Publication Data

US 2004/0113947 A1 Jun. 17, 2004

(51) Int. Cl.
G06F 15/00 (2006.01)
G06F 13/00 (2006.01)
(52) U.S. Cl. ................. 715/763; 715/765; 702/119
(58) Field of Classification Search ............... 715/763, 715/765, 762, 734, 736, 735; 702/118, 119
See application file for complete search history.

(56) References Cited

U.S. PATENT DOCUMENTS

| 5,841,960 | A | * | 11/1998 | Ibusuki et al. ................. 714/32 |
| 5,938,781 | A | * | 8/1999 | Proskauer .................... 714/724 |
| 6,002,868 | A | * | 12/1999 | Jenkins et al. ............... 717/105 |
| 6,577,981 | B1 | | 6/2003 | Grey et al. |
| 6,754,850 | B1 | | 6/2004 | Grey et al. |
| 2004/0255269 | A1 | | 12/2004 | Santori et al. |

OTHER PUBLICATIONS

"TestStand User Manual" National Instruments Corporation, 26 pages.
"TestStand Hands-On" NI-WEEK '98, Aug. 25, 1998, 21 pages.

* cited by examiner

Primary Examiner—Cao (Kevin) Nguyen
(74) Attorney, Agent, or Firm—Meyertons Hood Kivlin Kowert & Goetzel, P.C.; Jeffrey C. Hood; Jason L. Burgess

(57) ABSTRACT

A plurality of operator interface controls for use in a run-time operator interface application for executing one or more test executive sequences is described. Each operator interface control may have associated functionality for managing execution of a test executive sequence and/or functionality for displaying information regarding execution of a test executive sequence. One or more of the operator interface controls may be included in a run-time operator interface application, which may aid the user in easily creating the run-time operator interface application.

57 Claims, 20 Drawing Sheets

FIG. 4

| Step | Description | Execution Flow | Comment |
|---|---|---|---|
| Power On | Numeric Limit Test, 12 <= x <= 15, volt, Call P... | Precondition | |
| CPU | Call MainSequence in cpu.seq | | |
| ROM | Pass/Fail Test, Call ROMTest (computer.dll) | Precondition | |
| RAM | Pass/Fail Test, Call RAMTest (computer.dll) | Precondition | |
| Video | Numeric Limit Test, 70 <= x <= 75, hertz, Call ... | Precondition | |
| Keyboard | Pass/Fail Test, Call KeyboardTest (computer.dll) | Precondition | |
| ROM Diagnostics | Action, Call ROMDiagnostics (computer.dll) | Precondition | |
| RAM Diagnostics | Action, Call RAMDiagnostics (computer.dll) | Precondition | |
| Video Diagnostics | Action, Call VideoDiagnostics (computer.dll) | Precondition | |
| Keyboard Diagnostics | Action, Call KeyboardDiagnostics (computer.dll) | Precondition | |
| END | | | |

| Step Name | Description |
|---|---|
| Get Report Options | Reads report options, and calls the ReportOptions callback to give the client sequence file a chance the modify the report options. Call Get Report Options in <Current File> |
| Get Database Options | Call Get Database Options in <Current File> |
| Set Report Format | Action, Set Report.Format |
| Include Limits in Results | Configures the execution to include limits in the result list if the Include Test Limits option in the Report Options dialog box is enabled. Action, Call Execution.AddExtraResult |
| Include Comparison Type in Results | Configures the execution to include limit comparison types in the result list if the Include Test Limits option in the Report Options dialog box is enabled. Action, Call Execution.AddExtraResult |
| Next UUT | Increment the UUT index. The first UUT index is 1. |
| Increment UUT Index | Locals.UUT.UUTLoopIndex++ |
| Get System Run Time Error Option | Action, Get IEngine.RTEOption |
| Reset Executions Run Time Error... | Action, Set Execution.RTEOptionForThisExecut... |
| PreUUT Callback | Display the UUT dialog box. Call PreUUT in <Current File> |
| Goto End of UUT Loop If No More ... | Goto "End of UUT Loop" |
| | Determines the report file path using the Report Options settings. |

*FIG. 8*

OPERATOR INTERFACE CONTROLS FOR CREATING A RUN-TIME OPERATOR INTERFACE APPLICATION FOR A TEST EXECUTIVE SEQUENCE

FIELD OF THE INVENTION

The present invention relates to the field of test executive software for organizing and executing test executive sequences. In particular, the invention relates to a system and method for creating run-time operator interface applications for test executive sequences and to a set of operator interface controls for creating the run-time operator interface applications.

DESCRIPTION OF THE RELATED ART

Test executive software is specialized software that allows a user to organize and execute sequences of reusable test modules to test units under test (UUTs). For example, the test modules may interact with one or more hardware instruments to test the UUT(s). The test modules often have a standard interface and typically can be created in a variety of programming environments. The test executive software operates as a control center for the automated test system. More specifically, the test executive software allows the user to create, configure, and/or control test sequence execution for various test applications, such as production and manufacturing test applications. Text executive software typically includes various features, such as test sequencing based on pass/fail results, logging of test results, and report generation, among others.

Test executives include various general concepts. The following comprises a glossary of test executive nomenclature, as used herein:

Code Module—A program module, such as a Windows Dynamic Link Library (.dll), LabVIEW VI (.vi), ActiveX component, or other type of program module or component, that implements one or more functions that perform a specific test or other action.

Test Module—A code module that performs a test of a UUT.

Step—An action that the user can include within a sequence of other actions. A step may call a test module to perform a specific test.

Step Module—The code module that a step calls.

Sequence—A series of steps that the user specifies for execution in a particular order. Whether and when a step is executed can depend on the results of previous steps.

Sequence File—A file that contains the definition of one or more sequences.

Sequence Editor—A program that provides a graphical user interface for creating, editing, and debugging sequences.

Run-time Operator Interface Application—A program that provides a graphical user interface for executing sequences, e.g., on a production station. A sequence editor and run-time operator interface can be separate application programs or different aspects of the same program.

Test Executive Engine—A module or set of modules that provide an API for creating, editing, executing, and debugging sequences. A sequence editor or run-time execution operator interface may use the services of a test executive engine.

Application Development Environment (ADE)—A programming environment such as LabVIEW, LabWindows/CVI, Microsoft Visual C++, Microsoft Visual Basic, etc., in which the user can create test modules and run-time operator interfaces.

Unit Under Test (UUT)—The device or component that is being tested.

Thus, the user may use the sequence editor to construct a test executive sequence comprising a plurality of steps. The test executive sequence may then be executed to perform tests of a system or UUT, e.g., via a run-time operator interface application.

SUMMARY

A plurality of operator interface controls for use in a run-time operator interface application for executing one or more test executive sequences is described. Each operator interface control may have associated functionality for managing execution of a test executive sequence and/or functionality for displaying information regarding execution of a test executive sequence.

A graphical user interface that provides access to the plurality of operator interface controls may be displayed. For example, the graphical user interface (GUI) may be a GUI of an application development environment (ADE) used in creating the run-time operator interface application. One or more of the operator interface controls may be included in the run-time operator interface application in response to user input to the graphical user interface. One or more files representing the run-time operator interface application may be stored, and the run-time operator interface application may be executed.

Executing the run-time operator interface application may include executing program instructions associated with one or more of the operator interface controls included in the run-time operator interface application. The program instructions associated with the operator interface control(s) may execute to perform one or more of managing execution of a test executive sequence and/or displaying information regarding execution of a test executive sequence.

One embodiment of the invention provides the ability for the user to create "connections" or "bindings" between one or more GUI elements included in an application and a software component, referred to herein as a manager component. The connection or binding created between a GUI element and a manager component may allow the manager component to perform various operations for the GUI element without requiring the user to write code for these operations to be performed. This embodiment may greatly reduce the amount of code required to be written by a user to implement certain functionality. It is noted that the connections or bindings described in this embodiment may be used for any general type of operator interface or GUI application and is not limited to Test Executive applications.

BRIEF DESCRIPTION OF THE DRAWINGS

A better understanding of the present invention can be obtained when the following detailed description of the preferred embodiment is considered in conjunction with the following drawings, in which:

FIG. 4 illustrates one example of a test executive sequence, created according to one embodiment of a test executive application;

FIG. 8 illustrates an exemplary user interface for a sequence viewer operator interface control;

Figure 1:
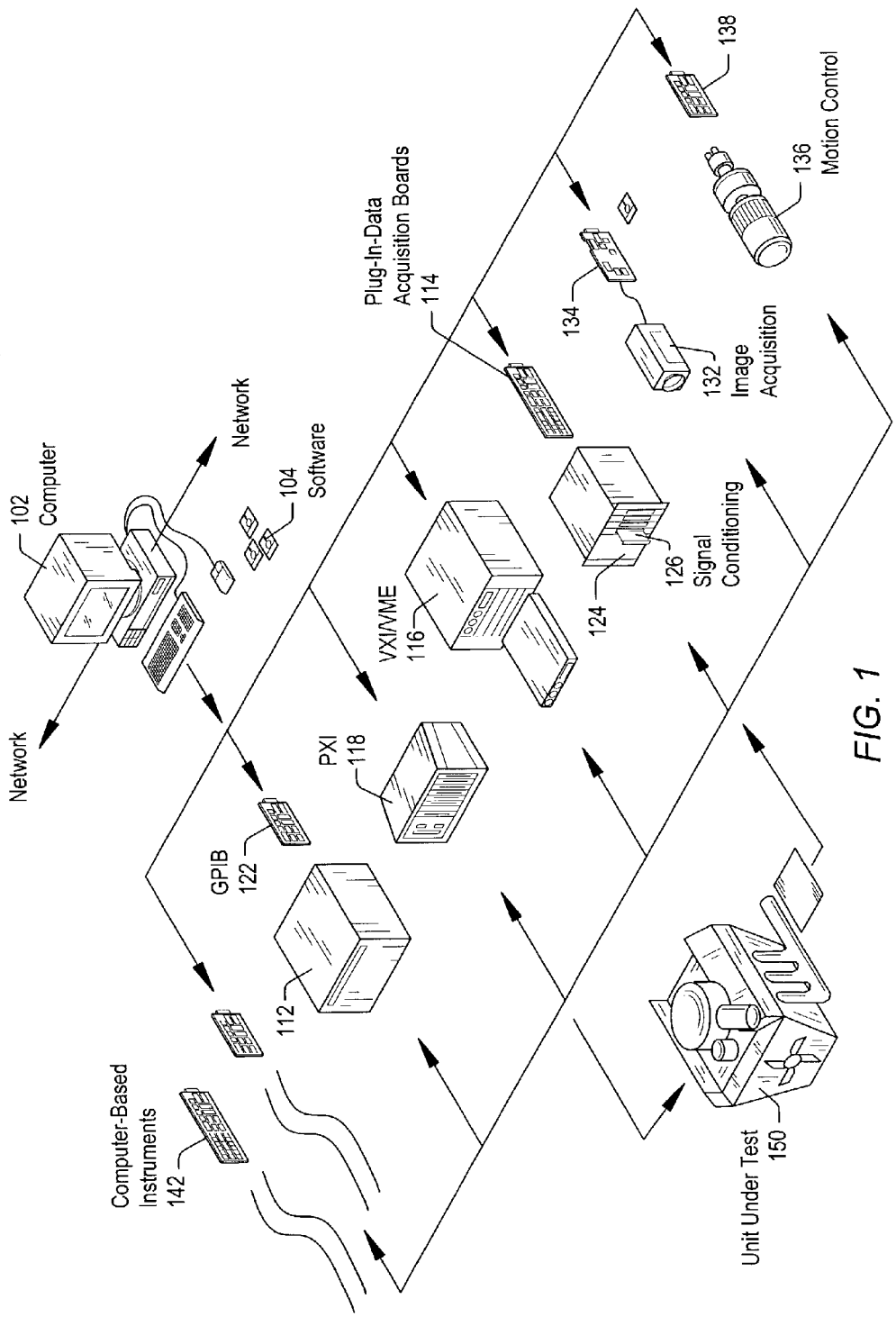
FIG. 1 illustrates an instrumentation control system according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Incorporation by Reference

The following references are hereby incorporated by reference in their entirety as though fully and completely set forth herein.

U.S. patent application Ser. No. 09/259,162 titled "Test Executive System and Method Including Step Types for Improved Configurability," filed Feb. 26, 1999.

U.S. patent application Ser. No. 09/943,988 titled "System and Method Enabling Hierarchical Execution of a Test Executive Subsequence," filed Aug. 31, 2001.

U.S. patent application Ser. No. 09/944,546 titled "System and Method Enabling Execution Stop and Restart of a Test Executive Sequence(s)," filed Aug. 31, 2001.

U.S. patent application Ser. No. 10/056,975 titled "Test Executive System Having XML Object Representation Capabilities," filed Jan. 25, 2002.

U.S. patent application Ser. No. 10/056,853 titled "Test Executive System Having XML Reporting Capabilities," filed Jan. 25, 2002.

FIG. 1—Instrumentation System

FIG. 1 illustrates an exemplary instrumentation control system 100. It is noted that FIG. 1 is exemplary only, and the present invention may be used in conjunction with any of various systems, as desired. The system 100 comprises a host computer 102 that connects to one or more instruments. The host computer 102 comprises a CPU, a display screen, memory, and one or more input devices such as a mouse or keyboard as shown.

The computer 102 may execute a run-time operator interface application for analyzing, measuring, and/or controlling a unit under test (UUT) or process 150. The run-time operator interface application may invoke execution of a test executive sequence to analyze, measure, and/or control the unit under test (UUT) or process 150. For example, the test executive sequence may include various steps referencing code modules operable to connect through the one or more instruments to analyze, measure, or control the unit under test (UUT) or process 150.

The test executive sequence may have been created using test executive software, e.g., a sequence editor such as described below. The test executive software may enable the test executive sequence to be programmatically invoked from a program, e.g., the run-time operator interface application. The run-time operator interface application may include a graphical user interface displayed on the computer 102 for executing the test executive sequence. This graphical user interface may have any of various appearances, e.g., may be customized for a particular testing application or a particular test executive sequence. For example, the run-time operator interface application may be written by a user and may include a graphical user interface appropriately customized for use by test operators working in the user's production facilities, e.g., in a plant or laboratory.

The graphical user interface of the run-time operator interface application may display any of various types of information regarding the test executive sequence and may enable a user, e.g., a test operator, to control execution of the test executive sequence in any of various ways. As one example, the graphical user interface may display steps of the test executive sequence, e.g., may display a list of steps. Various other types of information may also be displayed along with the steps of the test executive sequence, such as execution results of the steps, e.g., pass/fail results, numeric results, etc. The graphical user interface may also enable the user to invoke execution of the test executive sequence, stop or pause execution of the test executive sequence, specify a number of times to execute the test executive sequence, etc. As another example, the graphical user interface may also allow the user to view a report summarizing results of executing the test executive sequence. The graphical user interface may also allow the user to select a particular test executive sequence for execution. For example, the run-time operator interface application may be operable to invoke execution of multiple test executive sequences, e.g., together and/or separately, depending on which test executive sequence(s) is selected.

As described below, according to one embodiment of the invention, a plurality of operator interface controls may be provided to the user for use in creating the operator interface application. As used herein, the term "control" may include a software component or object having associated program instructions. Each operator interface control may have functionality implemented by the associated program instructions for one or more of managing execution of a test executive sequence and/or displaying information regarding execution of a test executive sequence. The operator interface controls may facilitate the efficient creation of a run-time operator interface application. Exemplary operator interface controls and a method for creating a run-time operator interface application using one or more operator interface controls are described in more detail below.

Referring again to FIG. 1, the one or more instruments of the instrumentation control system 100 may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 may be coupled to the computer 102 via a GPIB interface card 122 provided by the computer 102. In a similar manner, the video device 132 may be coupled to the computer 102 via the image acquisition card 134, and the motion control device 136 may be coupled to the computer 102 through the motion control interface card 138. The data acquisition board 114 may be coupled to the computer 102, and optionally interfaces through signal conditioning circuitry 124 to the UUT. The signal conditioning circuitry 124 may include an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes. The cards 122, 134, 138 and 114 may also be implemented as external devices coupled to the computer 102, such as through a serial bus.

The VXI chassis or instrument 116 may be coupled to the computer 102 via a serial bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical systems an instrument will not be present of each interface type, and in fact many systems may only have one or more instruments of a single interface type, such as only GPIB instruments.

The instruments may be coupled to the unit under test (UUT) or process 150, or may be coupled to receive field signals, typically generated by transducers. Other types of instruments or devices may be connected to the system, as desired.

The computer 102 may include a memory medium on which a run-time operator interface application is stored. The memory medium may store one or more operator interface controls included in the run-time operator interface application. In one embodiment, the memory medium may also store one or more test executive sequences which may be invoked by the run-time operator interface application. In one embodiment, the memory medium may also store test executive software used in executing the test executive sequence(s), e.g., a test executive engine. In various embodiments, one or more of the software elements described above may be included on remote computer systems.

In one embodiment, the memory medium may also store software used in creating or configuring the test executive sequence(s) and/or software used in creating the run-time operator interface application. For example, the software used in creating or configuring the test executive sequence(s) may include test executive software, e.g., a sequence editor, used in specifying or configuring steps of the test executive sequence(s). The software used in creating the run-time operator interface application may include one or more application development environments (ADEs).

The software used in creating the run-time operator interface application may also include a plurality of operator interface controls. In another embodiment, the test executive sequence(s) and/or the run-time operator interface application may be created on another computer system, e.g., a development computer system, and the software used in creating or configuring the test executive sequence(s) and/or the software used in creating the run-time operator interface application may not be stored on a memory medium of the computer 102.

As used herein, the term "memory medium" may include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs or elements are executed or located, or the memory medium may be located in a second different computer that connects to the first computer over a network, such as the Internet. In the latter instance, the second computer may provide program instructions or data to the first computer for execution or access.

Figure 2:
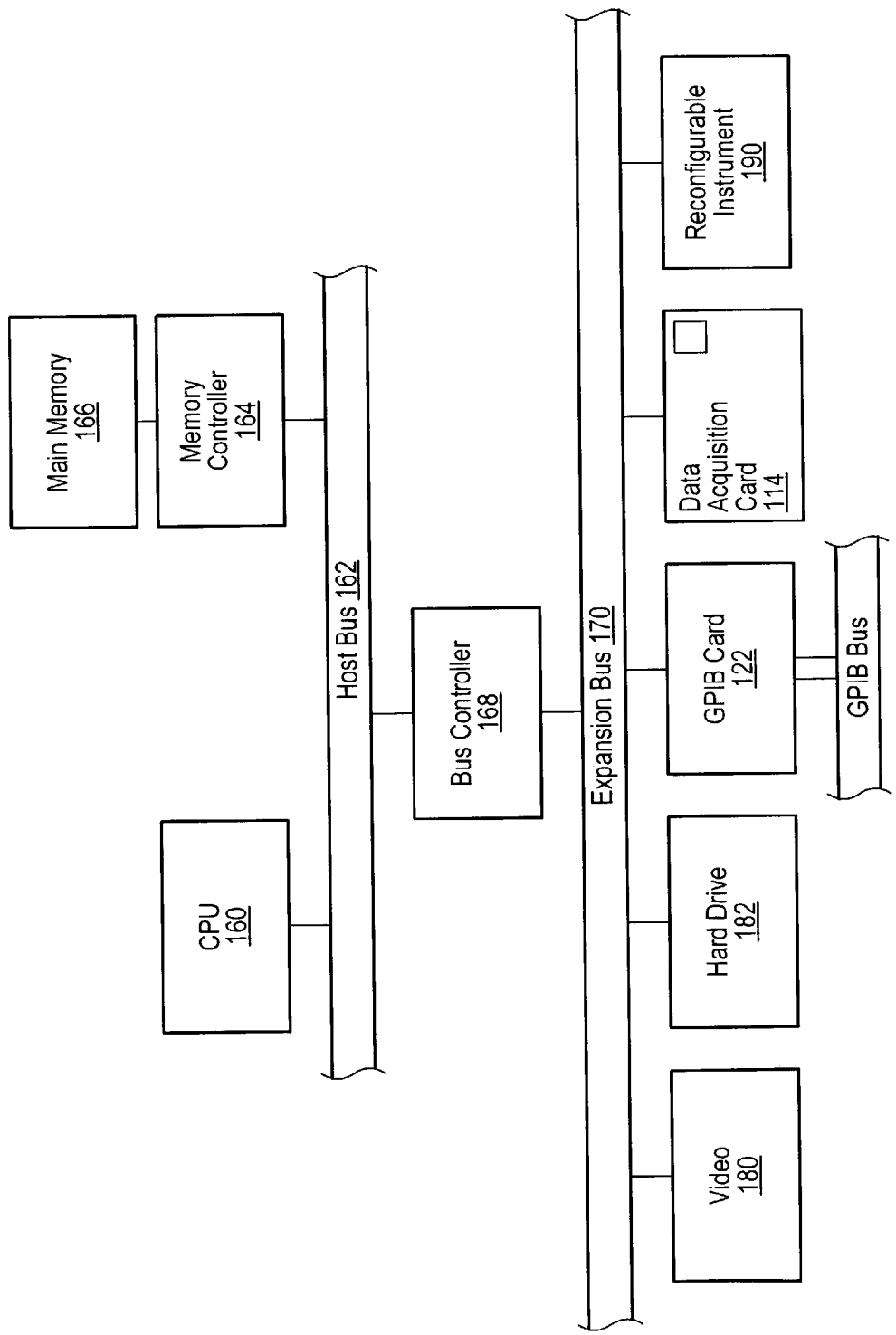
FIG. 2 is a diagram representing one embodiment of the computer system illustrated in FIG. 1.

FIG. 2—Computer System Block Diagram

FIG. 2 is a diagram of the computer system 102 illustrated in FIG. 1. Where one or more of the software elements described above with reference to FIG. 1 execute on different computer systems other than the computer system 102, FIG. 2 may also represent a diagram of these computer systems. It is noted that any type of computer system configuration or architecture can be used as desired, and FIG. 2 illustrates a representative PC embodiment. It is also noted that the computer system may be a general purpose computer system, a computer implemented on a VXI card installed in a VXI chassis, a computer implemented on a PXI card installed in a PXI chassis, or other types of embodiments. Elements of a computer not necessary to understand the present invention have been omitted for simplicity.

The computer 102 includes at least one central processing unit or CPU 160 that is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164. The main memory 166 may store software according to one embodiment of the invention, such as the software elements described above with reference to FIG. 1. The main memory 166 may also store operating system software as well as other software for operation of the computer system, as well known to those skilled in the art. The CPU 160 executing code and data from the main memory 166 may comprise a means for implementing the methods described below.

The host bus 162 is coupled to an expansion or input/output bus 170 by means of a bus controller 168 or bus bridge logic. The expansion bus 170 may be the PCI (Peripheral Component Interconnect) expansion bus, although other bus types can also be used. The expansion bus 170 may include slots for various devices such as the data acquisition board 114 (of FIG. 1) and a GPIB interface card 122 that provides a GPIB bus interface to the GPIB instrument 112 (of FIG. 1). A video display subsystem 180 and hard drive 182 coupled to the expansion bus 170 is also shown.

In one embodiment, a reconfigurable instrument 190 may also be connected to the computer 102. The reconfigurable instrument 190 may include a functional unit, also referred to as configurable logic, such as a programmable logic device (PLD), e.g., an FPGA, or a processor and memory, which may execute a real time operating system. Program instructions may be downloaded and executed on the reconfigurable instrument 190. In one embodiment, at least a portion of the software described herein may execute on the reconfigurable instrument 190. In various embodiments, the functional unit may be included on an instrument or device connected to the computer through means other than an expansion slot, e.g., the instrument or device may be connected via an IEEE 1394 bus, USB, or other type of port. Also, the functional unit may be included on a device such as the data acquisition board 114 or another device shown in FIG. 1.

Test Executive Software Components

Figure 3:
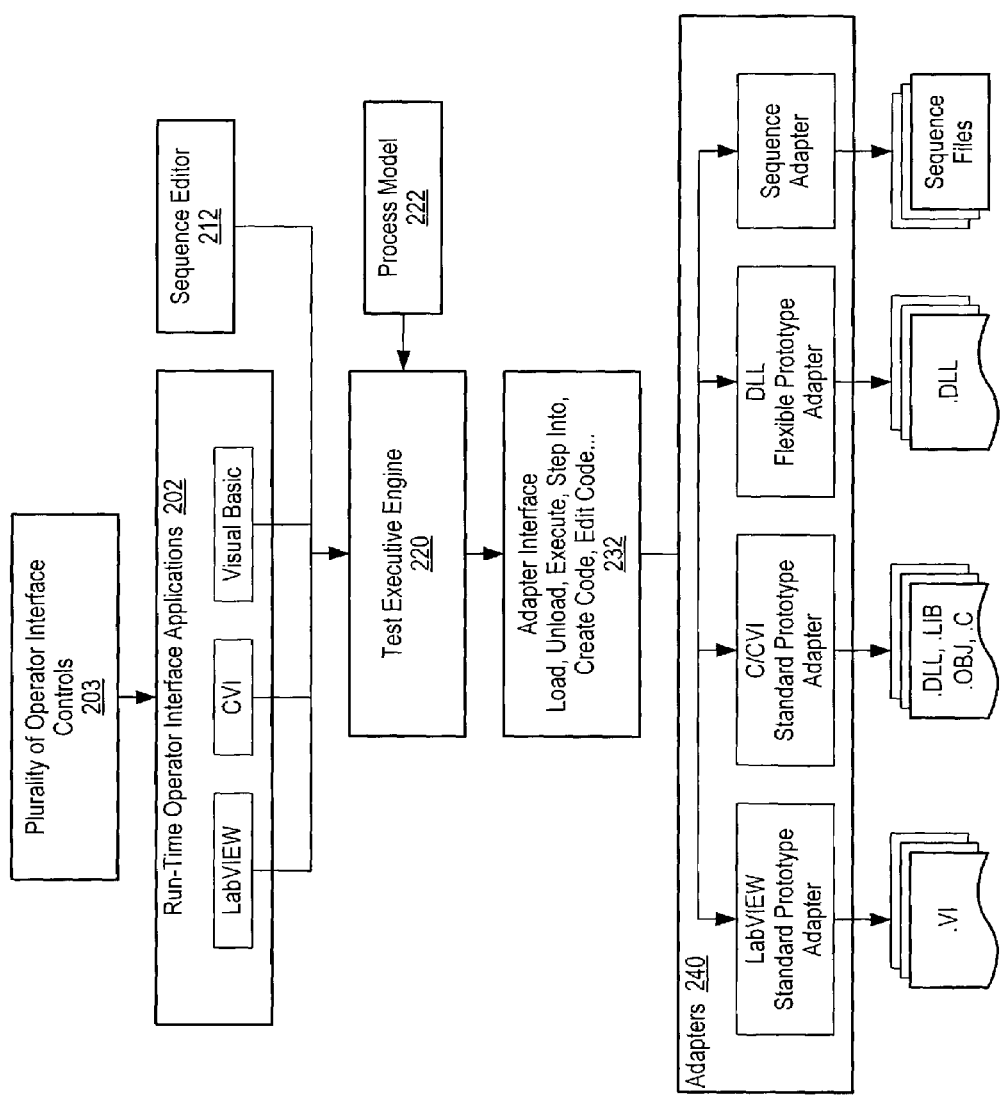
FIG. 3 is a diagram illustrating high-level architectural relationships between elements of one embodiment of a test executive software application.

FIG. 3 is a block diagram illustrating high-level architectural relationships between elements of one embodiment of a test executive software application. It is noted that FIG. 3 is exemplary, and the present invention may be utilized in conjunction with any of various test executive software applications or architectures.

The test executive software of FIG. 3 includes a sequence editor 212 for creating and editing test executive sequences. The sequence editor 212 may interface to the test executive engine 220. In one embodiment, one or more process models 222 may couple to the test executive engine 220. The test executive engine 220 may interface through an adapter interface 232 to one or more adapters 240. The adapters 240 shown in FIG. 3 include a LabVIEW standard prototype adapter, a C/CVI prototype adapter, a DLL flexible prototype adapter, and a sequence adapter. The LabVIEW standard prototype adapter may interface to code modules having a .VI extension, i.e., LabVIEW graphical programs. The C/CVI prototype adapter may interface to code modules having a .dll, lib, .obj, or .c extension. The DLL flexible prototype adapter may interface to code modules having a .dll extension. The sequence adapter may interface to sequence files.

The test executive engine 220 may manage the execution of test executive sequences. Test executive sequences include test executive steps that may call external or user-supplied code modules. By using module adapters 240 that have the standard adapter interface 232, the test executive engine 220 may load and execute different types of code modules. Thus, the test executive may be independent from particular application development environments (ADEs) used to create the code modules. In one embodiment, the test executive may use a special type of sequence called a process model to direct the high-level sequence flow.

As shown, one or more run-time operator interface applications 202 may interface to the test executive engine 220. As described above, custom run-time operator interface application(s) 202 for executing one or more test executive sequences may be created by a user. Also, in one embodiment, one or more default run-time operator interface applications 202 may be provided with the test executive software, which the user may then utilize or modify. A plurality of operator interface controls 203 may be provided. The operator interface controls 203 may be utilized in creating the run-time operator interface application(s) 202, as described in detail below.

The run-time operator interface applications 202 may be written or created using any of various' application development environments (ADEs). For example, the test executive engine 220 may provide an application programming interface (API) enabling programs written in various programming languages or ADEs to call the test executive engine 220. FIG. 3 illustrates the LabVIEW, LabWindows/CVI, and Visual Basic application development environments. However, in other embodiments, any of various other ADEs may be used to create a run-time operator interface application, including other Microsoft Visual Studio applications, the Delphi ADE, and Java ADEs, among others.

Test Executive Sequence Editor

The sequence editor 212 may be an application program in which the user creates, modifies, and/or debugs test executive sequences. The sequence editor 212 may have a graphical user interface (GUI) enabling a user to efficiently create a test executive sequence for testing a system or unit under test. For example, the sequence editor 212 may provide the user with easy access to test executive features, such as step types, step properties, sequence parameters, step result collection, etc.

Figure 5:
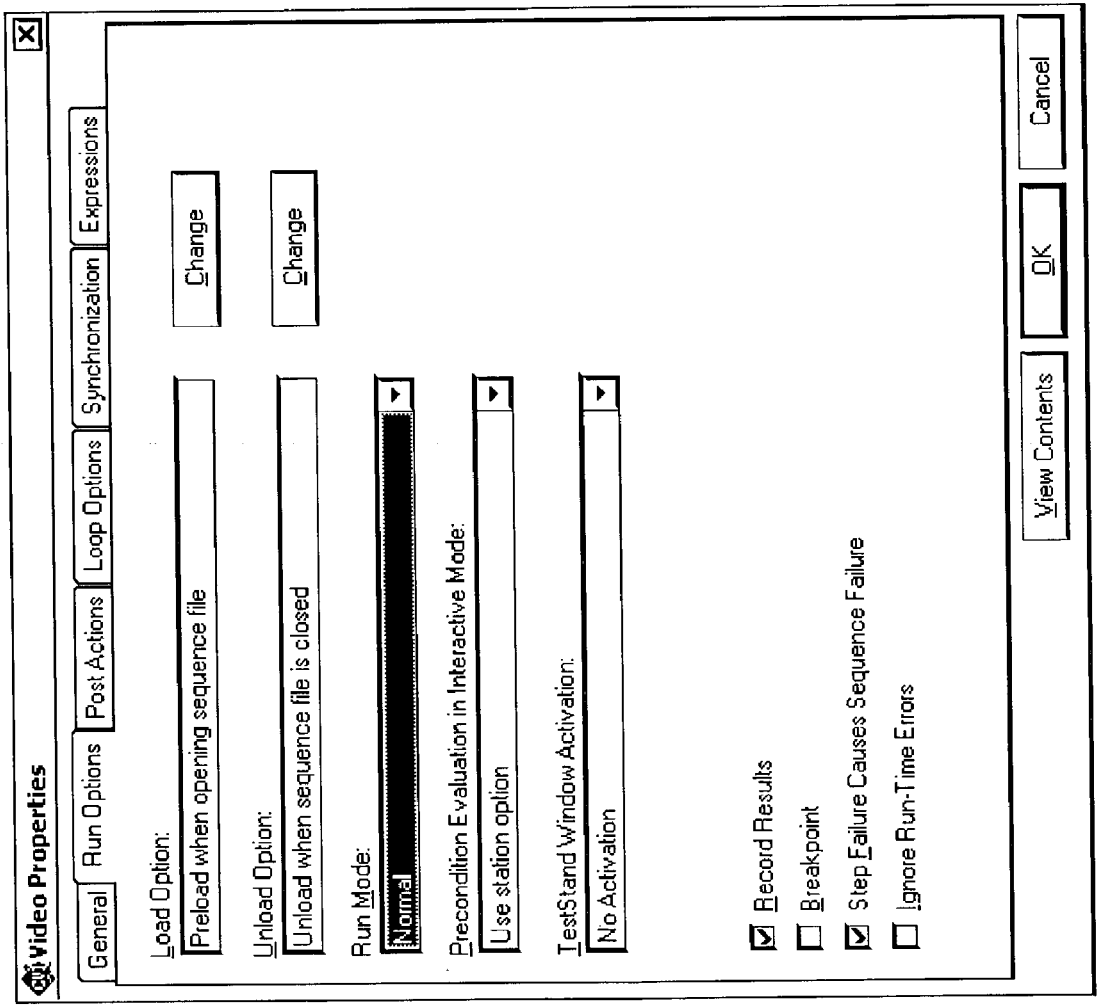
FIG. 5 illustrates a user interface for a test executive step, which enables the user to specify various properties for the step that affect the way the test executive software manages the execution of the step.

FIG. 4 illustrates one example of a test executive sequence, created according to one embodiment of a sequence editor 212. The exemplary sequence of FIG. 4 includes a plurality of test executive steps operable to test various aspects of a computer system. For example, the sequence includes a "ROM" step to test the computer's read-only memory, a "RAM" step to test the computer's random access memory, etc. Each step may call a user-supplied code module that interacts with the computer system to perform the desired test. The user may also specify various properties for each step that affect the way the test executive software manages the execution of the step. For example, FIG. 5 illustrates an exemplary dialog box for the "Video" step. As shown, a "Run Options" property page is selected in FIG. 5. The "Run Options" property page enables the user to specify various options for the step, such as whether to collect test results for the step, whether to break execution when the step is reached, whether to pre-load the step when opening the sequence file, etc.

In one embodiment, the sequence editor 212 may also include an execution window that provides debugging tools, e.g., debugging tools such as those found in application development environments such as LabVIEW, LabWindows/CVI, Microsoft Visual C/C++, Microsoft Visual Basic, etc. These may include features such as breakpoints, single stepping, tracing, a variable display, and a watch window.

Test Executive Engine

The test executive engine 220 may be used when creating, editing, executing, and debugging test executive sequences. The test executive engine 220 may also provide a test executive engine application programming interface (API) that enables another program to interface with the test executive engine 220 in order to perform these actions. For example, a run-time operator interface application may request the test executive engine 220 to execute a test executive sequence, stop execution of the test executive sequence, etc.

In one embodiment, the test executive engine 220 may export an object-based or component-based API, which in one embodiment may be an ActiveX Automation API. The sequence editor 212 and run-time operator interface applications 202 may use the test executive engine API. The engine API may be called from any programming environment able to use the API. For example, where the API comprises an ActiveX Automation API, the engine API may be called from any programming environment that supports access to ActiveX Automation servers. Thus, in various embodiments, the engine API may be called from operator interface applications or test modules written in various programming environments, including those that are written in LabVIEW, LabWindows/CVI, Microsoft Visual C++, Microsoft Visual Basic, Java, etc.

One task performed by the test executive engine 220 is to manage the execution of test executive sequences. Executing a sequence may comprise executing steps included in the sequence. Not all steps in the sequence are necessarily executed. For example, the user may configure some steps to be skipped, e.g., depending on execution results of previous steps.

For a step that references a user-supplied code module, executing the step may comprise executing the respective code module. In addition to these user-supplied code modules being executed, for each step, additional program instructions may be executed, wherein these additional program instructions implement additional functionality specified for the step. These additional program instructions may be specified by the test executive software, rather than being defined by the respective user-supplied code module for the step. As one example, when including a step in a sequence, the user may configure execution results of the step to be collected. In this example, when the step is executed, program instructions to store the step results accordingly may be executed in addition to the program instructions of a user-supplied code module that the step references.

It is noted that not all steps may reference a user-supplied code module. For example, the test executive may provide some step types that primarily affect various aspects of sequence execution and are not designed to reference user-supplied code modules.

As a test executive sequence is executed, various results may be generated, and these results may be collected, e.g., may be stored in one or more data structures. In various embodiments, the results may be generated or structured in any of various ways. For example, in one embodiment, there may be one or more results for the unit under test (UUT) as a whole, as well as results for individual steps in the sequence. The results may vary in data type as well.

Steps

As described above, a test executive sequence comprises a plurality of steps. A step can do many things, such as initializing an instrument, performing a complex test, or making a decision that affects the flow of execution in a sequence. Steps may perform these actions through several types of mechanisms, including jumping to another step, executing an expression, calling a sub-sequence or calling an external code module. The term "step module" is used to refer to the code module that a step calls.

Steps may have custom properties. For steps that call code modules, custom step properties may be useful for storing parameters to pass to the code module for the step. They may also serve as a place for the code module to store its results. The test executive API may be used to access the values of custom step properties from code modules.

In one embodiment, not all steps call code modules. Some steps may perform standard actions that the user configures using a dialog box. In this case, custom step properties may be useful for storing configuration settings that the user specifies.

Built-In Step Properties

Steps may have a number of built-in properties that the user can specify. In one embodiment, exemplary built-in step properties include:

Preconditions that allow the user to specify the conditions that must be true for the test executive to execute the step during the normal flow of execution in a sequence.

Load/Unload Options that allow the user to specify when the test executive loads and unloads the code modules or subsequences that each step invokes.

Run Mode that allows a step to be skipped or forced to pass or fail without executing the step module.

Record Results that allows the user to specify whether the test executive collects the results of the step.

Step Failure Causes Sequence Failure that allows the user to specify whether the test executive sets the status of the sequence to "Failed" when the status of the step is "Failed".

Ignore Run-Time Errors that allows the user to specify whether the test executive continues execution normally after the step even though a run-time error occurs in the step.

Post Actions that allows the user to specify the execution of callbacks or jump to other steps after executing the step, depending on the pass/fail status of the step or any custom condition.

Loop options that allow the user to cause a single step to execute multiple times before executing the next step. The user can specify the conditions under which to terminate the loop. The user can also specify whether to collect results for each loop iteration, for the loop as a whole, or for both.

Pre Expression that allows the user to specify an expression to evaluate before executing the step module.

Post Expression that allows the user to specify an expression to evaluate after executing the step module.

Status Expression that allows the user to specify an expression to use to set the value of a "status" property of the step automatically.

FIG. 6

Figure 6:
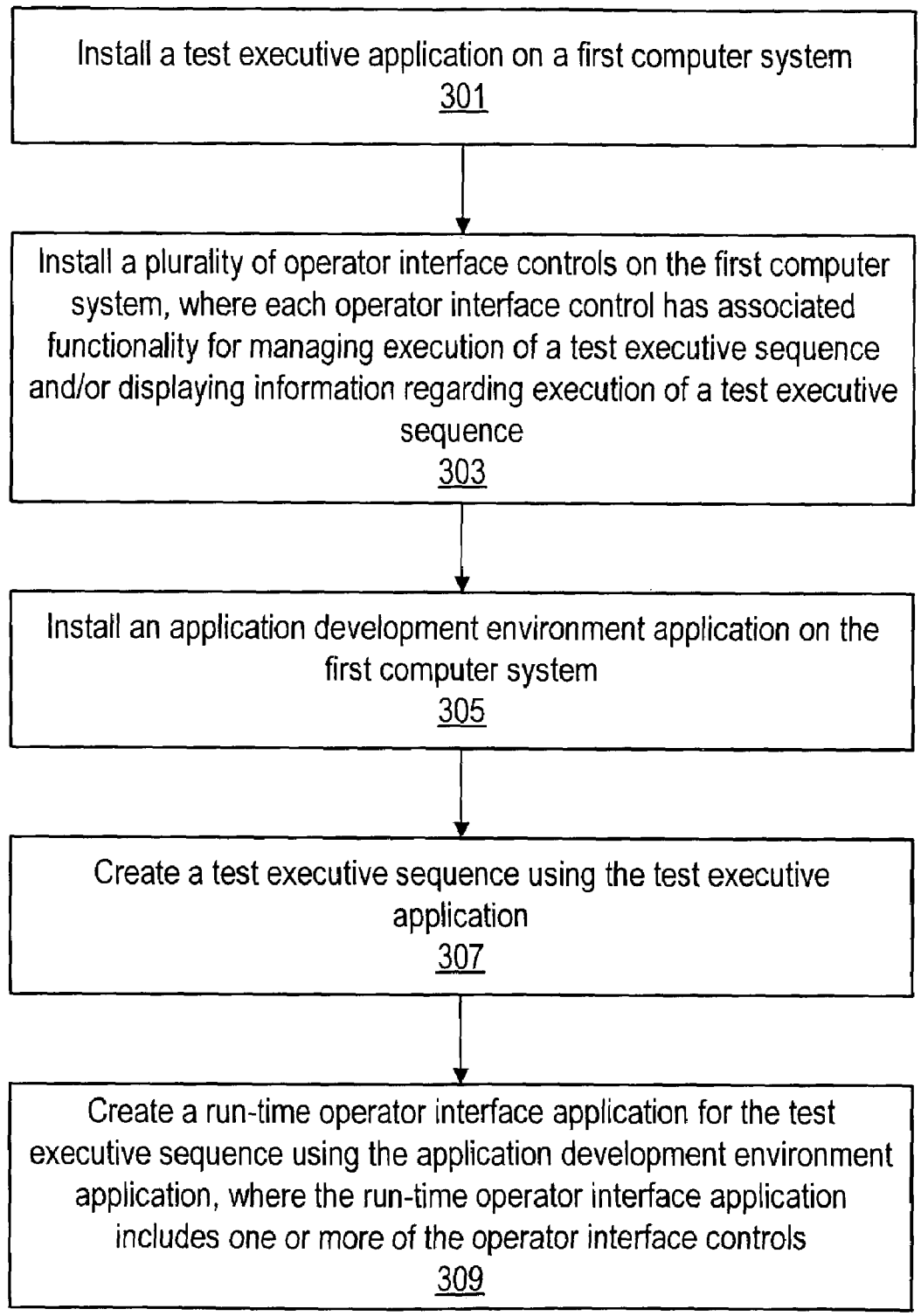
FIG. 6 is a flowchart diagram illustrating one embodiment of a method for creating a run-time operator interface application.

FIG. 6 is a flowchart diagram illustrating one embodiment of a method for creating a run-time operator interface application. It is noted that FIG. 6 illustrates a representative embodiment, and alternative embodiments are contemplated. Also, various elements may be combined, omitted, or performed in different orders.

In 301, a test executive application may be installed on a first computer system. As used herein, installing an application on a computer system may include enabling the computer system to execute the application. For example, one or more executable files associated with the application or providing access to the application may be installed on the computer system.

In 303, a plurality of operator interface controls may be installed on the first computer system. For example, files or data representing or providing access to the operator interface controls may be stored on the first computer system. In one embodiment, the plurality of operator interface controls may be installed as a part of installing the test executive application in 301. In another embodiment, the operator interface controls may be installed separately. For example, the operator interface controls may be installed separately as a toolkit or add-on package to the test executive application.

Each operator interface control may have associated functionality for managing execution of a test executive sequence and/or functionality for displaying information regarding execution of a test executive sequence. Exemplary operator interface controls are described below.

The operator interface controls may be implemented using any of various programming methodologies or technologies. As used herein, the term "control" may include a software component or object having associated program instructions. In one embodiment, the operator interface controls may be implemented as ActiveX controls. In other embodiments, the operator interface controls may be implemented as Java components or according to any of various other public or proprietary specifications.

In 305, an application development environment (ADE) application may be installed on the first computer system. As used herein, the term "application development environment" may include an application useable to create a computer program. Examples, of application development environments include LabVIEW and LabWindows/CVI from National Instruments, Visual Studio (e.g., Visual Basic, Visual C++, etc.) from Microsoft, Delphi from Borland, numerous Java environments from various vendors, etc.

In 307, a test executive sequence may be created using the test executive application installed in 301. For example, the test executive sequence may be created using a sequence editor of the test executive application, such as described above. The test executive sequence may include a plurality of test executive steps.

In 309, a run-time operator interface application for the test executive sequence may be created using the ADE installed in 305. In various embodiments, the run-time operator interface application may be implemented using any of various ADEs or any of various programming methodologies or techniques. For example, in one embodiment, the run-time operator interface application may comprise a graphical program, such as a program created in the LabVIEW graphical programming development environment. In another embodiment, the run-time operator interface application may comprise a text-based program, such as a C, C++, or Java program, among others.

The run-time operator interface application may include one or more of the operator interface controls installed in 303. Utilizing the operator interface controls to create the run-time operator interface application may advantageously increase the efficiency of creating the run-time operator interface application. One embodiment of 309 is discussed below with reference to FIG. 7.

FIG. 7

Figure 7:
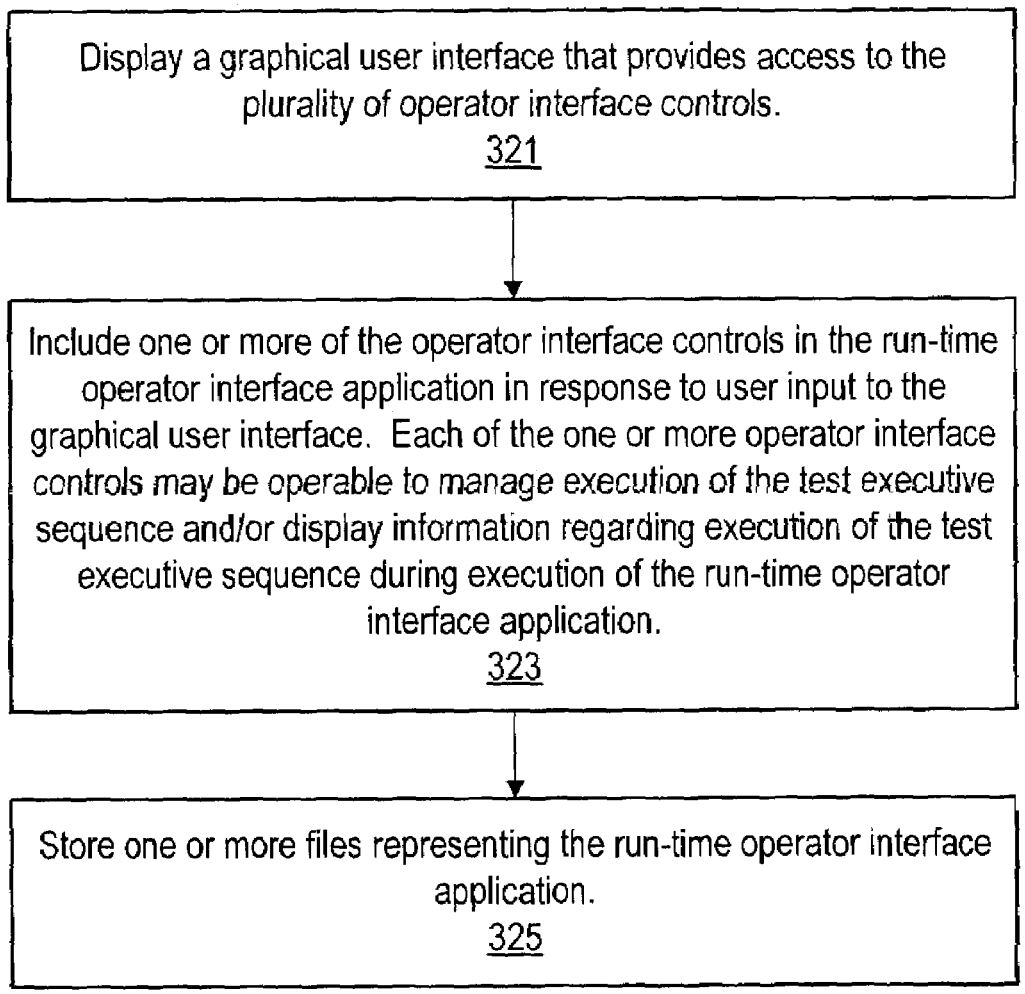
FIG. 7 is a more detailed flowchart diagram illustrating one embodiment of a method for creating a run-time operator interface application utilizing one or more operator interface controls.

FIG. 7 is a more detailed flowchart diagram illustrating one embodiment of a method for creating a run-time operator interface application. It is noted that FIG. 7 illustrates a representative embodiment, and alternative embodiments are contemplated. Also, various elements may be combined, omitted, or performed in different orders.

In 321, a graphical user interface that provides access to the plurality of operator interface controls may be displayed. For example, the graphical user interface (GUI) may be a GUI of the application development environment (ADE) installed on the first computer system as described above. The GUI of the ADE may enable the user (programmer) to select desired operator interface controls to include in the run-time operator interface application.

In various embodiments, the GUI may provide access to the operator interface controls in various ways, e.g., depending on the particular ADE being used and/or depending on the implementation of the operator interface controls. For example, in one embodiment, the GUI may simply provide a file dialog box enabling the user to select a filename of a desired operator interface control. In another embodiment, the GUI may be operable to display a list of available operator interface controls (and possibly other installed controls), e.g., in response to a user request to select a control. In another embodiment, the GUI may represent the operator interface controls visually, e.g., as an icon or picture.

In 323, one or more of the operator interface controls may be included in the run-time operator interface application in response to user input to the graphical user interface. Similarly as described above with reference to element 321, in various embodiments, the one or more operator interface controls may be included in the run-time operator interface application in various ways, e.g., by selecting filenames of the one or more operator interface controls, selecting the one or more operator interface controls from a list, dragging and dropping a visual representation of the one or more operator interface controls into a window for the run-time operator interface application, etc. In another embodiment, an operator interface control may be included in a run-time operator interface application by simply adding source code to the application that references the operator interface control.

In one embodiment, one or more of the operator interface controls may have a visual representation within the run-time operator interface application when included in the application. For example, in one embodiment, the operator interface controls may be included in a user interface, e.g., a user interface window, of the run-time operator interface application. Each operator interface control included in the user interface may be displayed in the user interface as the run-time operator interface application is being developed.

In one embodiment, one or more of the operator interface controls included in the application may also have an associated user interface which is displayed in the user interface of the run-time operator interface application when the run-time operator interface application is executed. For example, some of the operator interface controls may be designed to receive input to the run-time operator interface application and/or display output of the run-time operator interface application during execution of the application. Other operator interface controls may not be intended to be visible to the user during execution of the run-time operator interface application. These operator interface controls may be visually represented when the run-time operator interface application is being developed, but may not appear when the application is executed.

As noted above, each of the one or more operator interface controls may be operable to manage execution of a test executive sequence and/or display information regarding execution of the test executive sequence during execution of the run-time operator interface application. The operator interface controls may include pre-existing program instructions that implement this functionality. For example, in managing execution of a test executive sequence, an operator interface control may interface with the test executive application, e.g., may perform various programmatic calls to a test executive engine through an engine API, such as described above.

In one embodiment, each operator interface control may include one or more associated methods operable to perform one or more of managing execution of a test executive sequence and/or displaying information regarding execution of the test executive sequence. For example, the user may add source code to the run-time operator interface application for invoking various methods of the operator interface controls. Also, in one embodiment methods of the operator interface controls may be automatically invoked in response to certain events, e.g., in response to certain user interface events.

In one embodiment, the user may also configure one or more of the operator interface controls included in the run-time operator interface application. The operator interface controls may be configured in various ways, e.g., depending on the implementation of the operator interface controls and/or depending on the particular ADE being used. For example, in one embodiment, each of the one or more operator interface controls included in the application may have one or more associated properties. Thus, the user may provide user input to configure properties associated with the operator interface controls. For example, in one embodiment a property panel for configuring each operator interface control may be displayed, and user input to configure the properties may be received to the property panel. For example, the property panel may include one or more separate windows or dialog boxes, or user interface elements for setting the properties may be displayed in a portion of another window.

In various embodiments, the plurality of operator interface controls may have any of various kinds of functionality that helps the user in creating a run-time operator interface application. Exemplary operator interface controls include:

An "engine" control operable to bind to the test executive engine to manage execution of a test executive sequence. This control may not have a user interface that appears in the run-time operator interface application at execution time. In one embodiment, functions of the engine control include: performing a start procedure to start up the test executive engine, performing a shutdown procedure to shut down the test executive engine, etc.

A "sequence viewer" control operable to automatically display steps of a test executive sequence. This control may have a user interface that appears in the run-time operator interface application at execution time for displaying the steps. For example, the user interface may display the steps as a list. FIG. 8 illustrates an exemplary user interface for a sequence viewer control.

Figure 9:
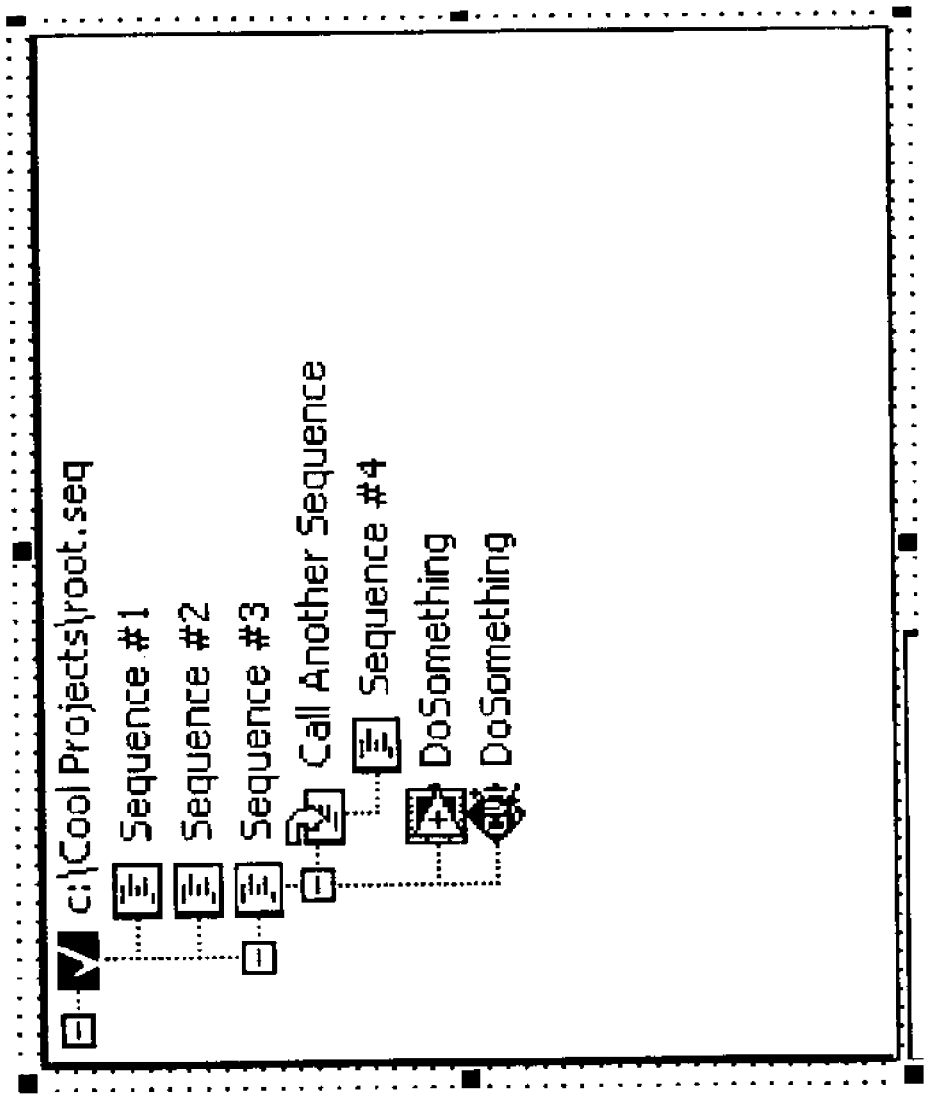
FIG. 9 illustrates an exemplary user interface for an execution hierarchy operator interface control.

An "execution hierarchy" control operable to automatically display an execution hierarchy for a test executive sequence. This control may have a user interface that appears in the run-time operator interface application at execution time for displaying the execution hierarchy. FIG. 9 illustrates an exemplary user interface for an execution hierarchy control. In one embodiment, the end user may be able to provide input to this user interface to select a particular point within the hierarchy at which he desires execution to start.

A "report viewer" control operable to automatically display a report generated when a test executive sequence is executed and/or display execution results of the test executive sequence. This control may have a user interface that appears in the run-time operator interface application at execution time to display the report.

Various types of button controls having user interfaces. For example, when the run-time operator interface application is executed, the user may click a first button to invoke execution of a test executive sequence, may click a second button to stop execution of the test executive sequence, etc.

It is noted that the controls listed above are exemplary only, and operator interface controls that provide any of various other types of functionality may be supported in other embodiments. Also, in other embodiments, functionality of one or more of the controls described above may be combined into a single operator interface control. For example, in some embodiments there may be no need for a separate engine control that manages execution of the test executive sequence, as this functionality may be subsumed by other operator interface controls.

In one embodiment, one or more of the operator interface controls may be aware of each other. For example, if a first operator interface control and a second operator interface control are both included in the run-time operator interface application, then the first operator interface control may be operable to automatically affect the second operator interface control during execution of the run-time operator interface application. As one example, consider a first operator interface button control designed for displaying a file dialog box for selecting a test executive sequence. When the run-time operator interface application is executed, the user may click on the first operator interface control to select a test executive sequence he desires to execute. In response to the user's selection, the first operator interface control may be operable to cause a second operator interface control, e.g., a sequence viewer control such as described above, to automatically display a list of steps in the selected test executive sequence.

It is noted that in addition to including the operator interface controls in the run-time operator interface application, the user may also add source code to the application. For example, as noted above, the user may add source code to the run-time operator interface application for invoking various methods of the operator interface controls. Also, in addition to the operator interface controls, the user may also add other controls to the run-time operator interface application. These controls may not have pre-existing functionality designed for managing execution of a test executive sequence and/or displaying information regarding execution of a test executive sequence. However, the user may desire to customize the run-time operator interface application in various ways or may desire to add other functionality to the application. Also, the user may configure the run-time operator interface application to manage execution of a test executive sequence at a lower level, e.g., by adding source code to the application for calling various API functions of the test executive software.

In one embodiment, an operator interface control may also defer to the run-time operator interface application code itself to perform certain actions associated with managing execution of the test executive sequence or displaying information regarding execution of the test executive sequence. For example, an operator interface control may send an event to the run-time operator interface application code, which the code may either ignore or handle. For example, in an embodiment in which the operator interface controls are implemented as ActiveX controls, the operator interface controls may be operable to send various ActiveX events to the run-time operator interface application code.

Referring again to FIG. 7, in 325, one or more files representing the run-time operator interface application may be stored. The one or more files may include information specifying which operator interface controls are included in the run-time operator interface application or may include references to the included controls.

When the run-time operator interface application is complete, the application may be executed. Executing the run-time operator interface application may include executing program instructions associated with one or more of the operator interface controls included in the run-time operator interface application. For example, the program instructions may execute in response to the user providing various types of user input to user interfaces of the operator interface controls and/or in response to various types of programmatic events. For example, the user may configure particular methods of the operator interface controls to be invoked in response to certain user interface events, or the methods may be automatically invoked in response to the events. Also, as noted above, a first operator interface control may call a second operator interface control to cause program instructions associated with the second operator interface control to execute.

Executing the run-time operator interface application may also include executing one or more test executive sequences. For example, a first operator interface control may enable the user to select the desired test executive sequence(s) to execute (e.g., in response to the user clicking on a button user interface of the first operator interface control), a second operator interface control may display steps of the selected sequence(s) (e.g., in a list user interface of the second operator interface control), and a third operator interface control may invoke execution of the selected sequence(s) (e.g., in response to the user clicking on a button user interface of the third operator interface control). In another embodiment, the sequence(s) may be executed automatically in response to selecting the sequence(s). As described above, when the test executive sequence(s) is/are executed, the test executive sequence(s) may be operable to perform one or more tests of one or more units under test (UUTs).

Operator interface controls such as those described above may advantageously remove the burden on the user (programmer) from implementing at least a portion of the functionality for a run-time operator interface application. For example, a common feature for run-time operator interface applications is to display a list of steps in a test executive sequence. A sequence viewer operator interface control such as described above may be operable to automatically display the steps of a specified sequence and may eliminate the need for the user (programmer) to write code to perform such tasks as obtaining a reference to a sequence file containing the test executive sequence, enumerating and obtaining references to the sequences that are in the sequence file, enumerating and obtaining information regarding steps of the desired sequence, formatting the step information appropriately, displaying the formatted information, etc. The sequence viewer control may be bound to the test executive engine and may interface with the engine to automatically perform these tasks.

As described above, in one embodiment, the user may be able to configure various properties of the operator interface controls. These properties may allow the user to specify various options controlling the sequence execution management or display performed by the operator interface controls. For example, with respect to a sequence viewer control, these properties may allow the user to customize the appearance of a displayed list of steps. For example, the user may be able to configure properties to specify a desired number of columns in the list, headings for each column, step information displayed in each column, an ordering of the columns, colors for the column data, etc. As one example, the user may configure a first column to display a name of the steps and a second column to display execution results of the steps. In one embodiment, the user may supply an expression for each column, where the expression evaluates to the desired data for the column.

FIGS. 10–12

Figure 10:
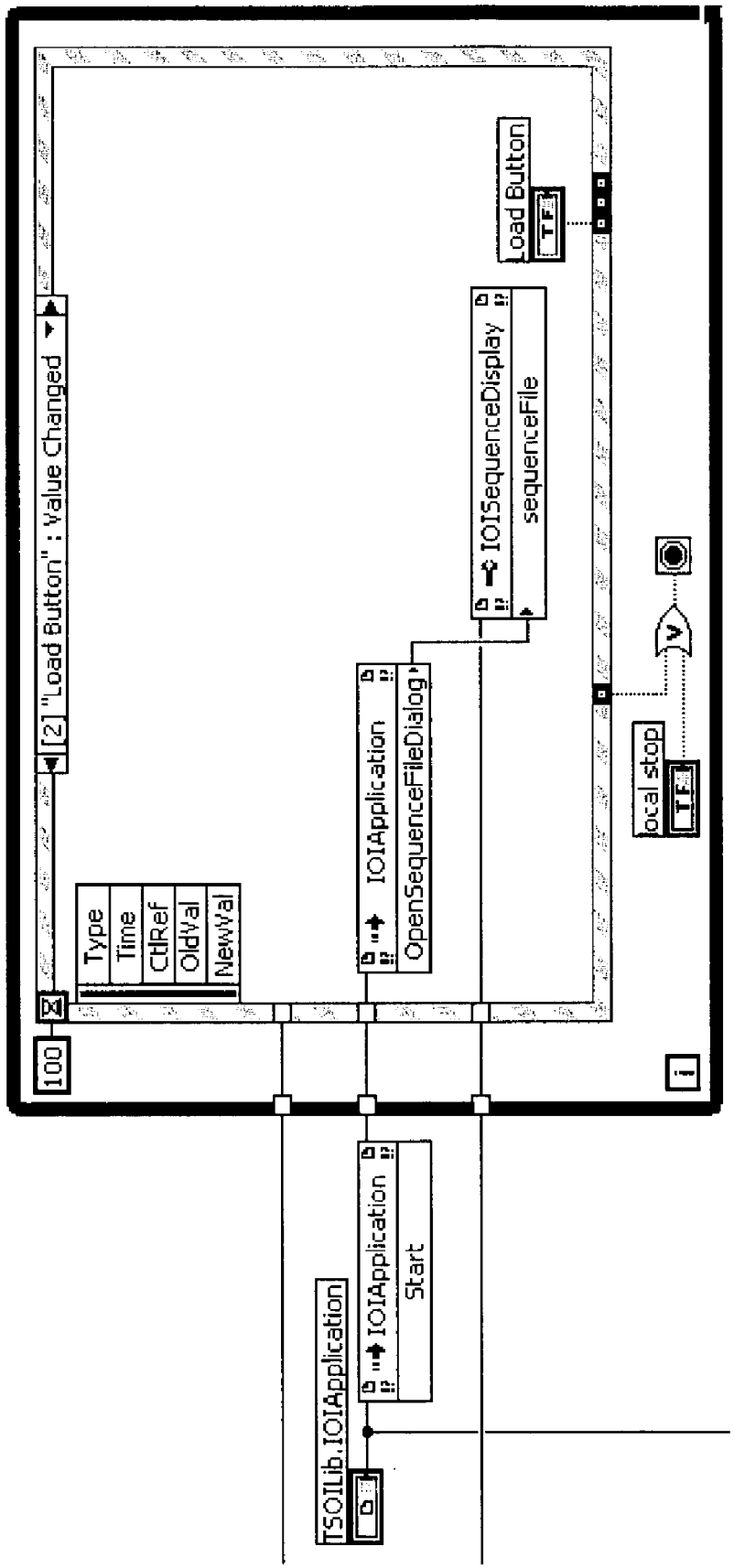
FIGS. 10–12 illustrate an exemplary graphical program that utilizes exemplary operator interface controls.
Figure 11:
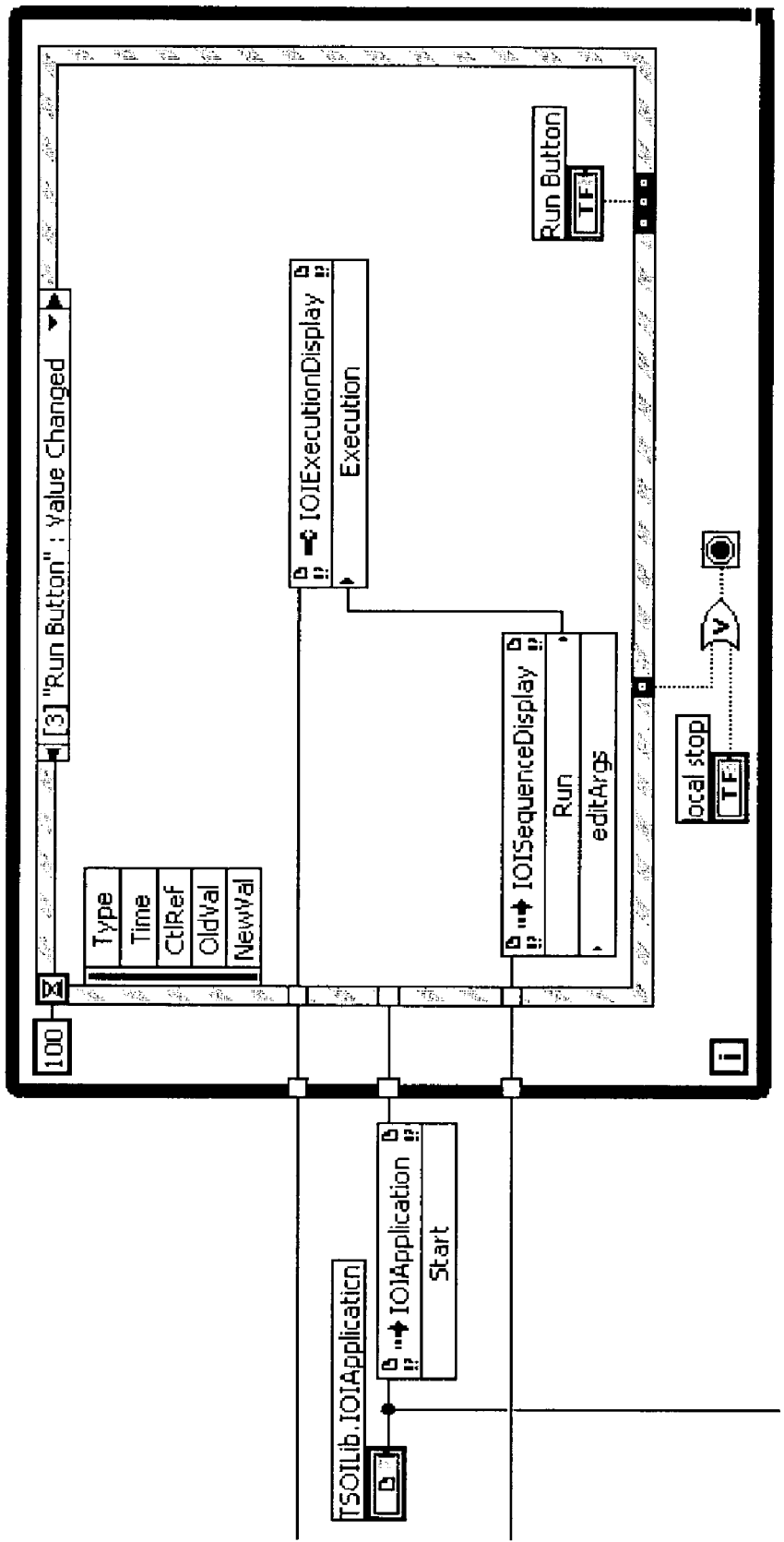
Figure 12:
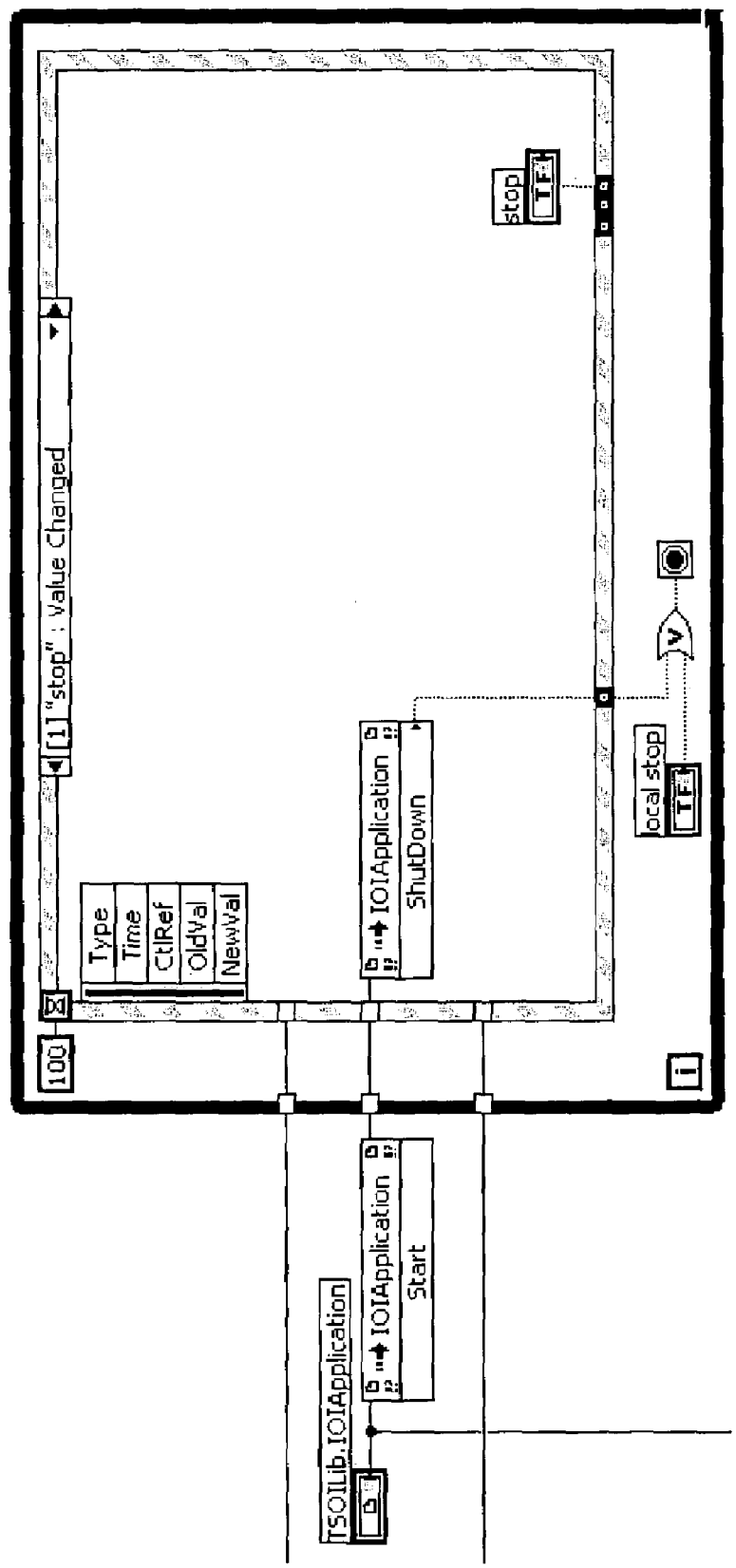

As noted above, in one embodiment a run-time operator interface application may comprise a graphical program. FIGS. 10–12 illustrate an exemplary graphical program that utilizes exemplary operator interface controls. It is notes that FIGS. 10–12 illustrate one exemplary embodiment, and many alternative embodiments are contemplated in accordance with the methods described above.

FIG. 10 illustrates a block diagram of the graphical program. The graphical program performs a "Start" method call on an "IOIApplication" operator interface control to start up the test executive engine. The "IOIApplication" operator interface control is one example of an engine operator interface control such as described above.

As shown in FIG. 10, the graphical program also includes an event structure having various sub-diagrams for responding to various user interface events. In FIG. 10, the event structure is labeled, "Load Button: Value Changed", indicating that graphical source code for responding to a "Value Changed" event for a "Load" button is currently displayed. This graphical source code may be executed when the user clicks on the "Load" button during execution of the graphical program. (The user interface of the graphical program is not shown.)

As shown, the graphical source code for responding to the "Value Changed" event for the "Load" button performs an "OpenSequenceFileDialog" method call on the "IOIApplication" operator interface control to allow the user to select a desired sequence file. A reference to the selected sequence file is passed to an "IOISequenceDisplay" operator interface control, and this operator interface control displays a sequence found in the selected sequence file. The "IOISequenceDisplay" operator interface control is one example of a sequence viewer operator interface control such as described above.

In FIG. 11, the event structure is labeled, "Run Button: Value Changed", indicating that graphical source code for responding to a "Value Changed" event for a "Run" button is currently displayed. This graphical source code may be executed when the user clicks on the "Run" button during execution of the graphical program. As shown, the graphical source code for responding to the "Value Changed" event for the "Run" button performs a "Run" method call on the "IOISequenceDisplay" operator interface control and an "Execution" method call on an "IOIExecutionDisplay" operator interface control to invoke execution of the displayed sequence.

In FIG. 12, the event structure is labeled, "stop: Value Changed", indicating that graphical source code for responding to a "Value Changed" event for a "Stop" button is currently displayed. This graphical source code may be executed when the user clicks on the "Stop" button during execution of the graphical program. As shown, the graphical source code for responding to the "Value Changed" event for the "Stop" button performs a "ShutDown" method call on the "IOIApplication" operator interface control to shut down the test executive engine.

GUI Element Connections

In one embodiment, one or more GUI elements included in an application may have a connection or binding to a software component, referred to herein as a manager component. The GUI element may be any type of control and indicator for receiving input data or viewing output data, respectively. For example, the GUI elements may be operator interface controls as described above, or other types of GUI elements. The GUI elements may be used in any of various applications, such as a test executive application, as described above. This embodiment may comprise various types of manager components, such as a Sequence File View Manager, an Application Manager, and an Execution Manager.

The connection or binding created between a GUI element and a manager component may allow the manager component to perform various operations for the GUI element without requiring the user to write code for these operations to be performed. For example, the manager component may provide data to, receive data from, and/or perform other functionality associated with the GUI element without requiring the user to write code for these actions to be performed. Thus, for example, the manager component may act as a data source for a "connected" GUI element. As another example, the manager component may act as a data sink to receive user values input to a "connected" GUI element. As another example, if the user selects a certain option in a GUI element, and the GUT element has a connection with a manager component, the manager component may analyze the option selected by the user for the GUI component and might perform certain operations based on the option selected. For example, the manager component may display additional GUI elements based on the user's selected option or may change other parameters in other GUI elements based on the user selected option in the GUI element.

Therefore, one embodiment of the invention provides the ability to create connections or bindings between GUI elements or operator interface controls in an application, and a software component such as a manager component. This embodiment may greatly reduce the amount of code required to be written by a user to implement certain functionality. It is noted that the connections or bindings described in this embodiment may be used for any general type of operator interface or GUI application and is not limited to Test Executive applications.

FIGS. 13–20 are screen shots illustrating use of "connections" in operator control interfaces according to one embodiment of the invention.

Figure 13:
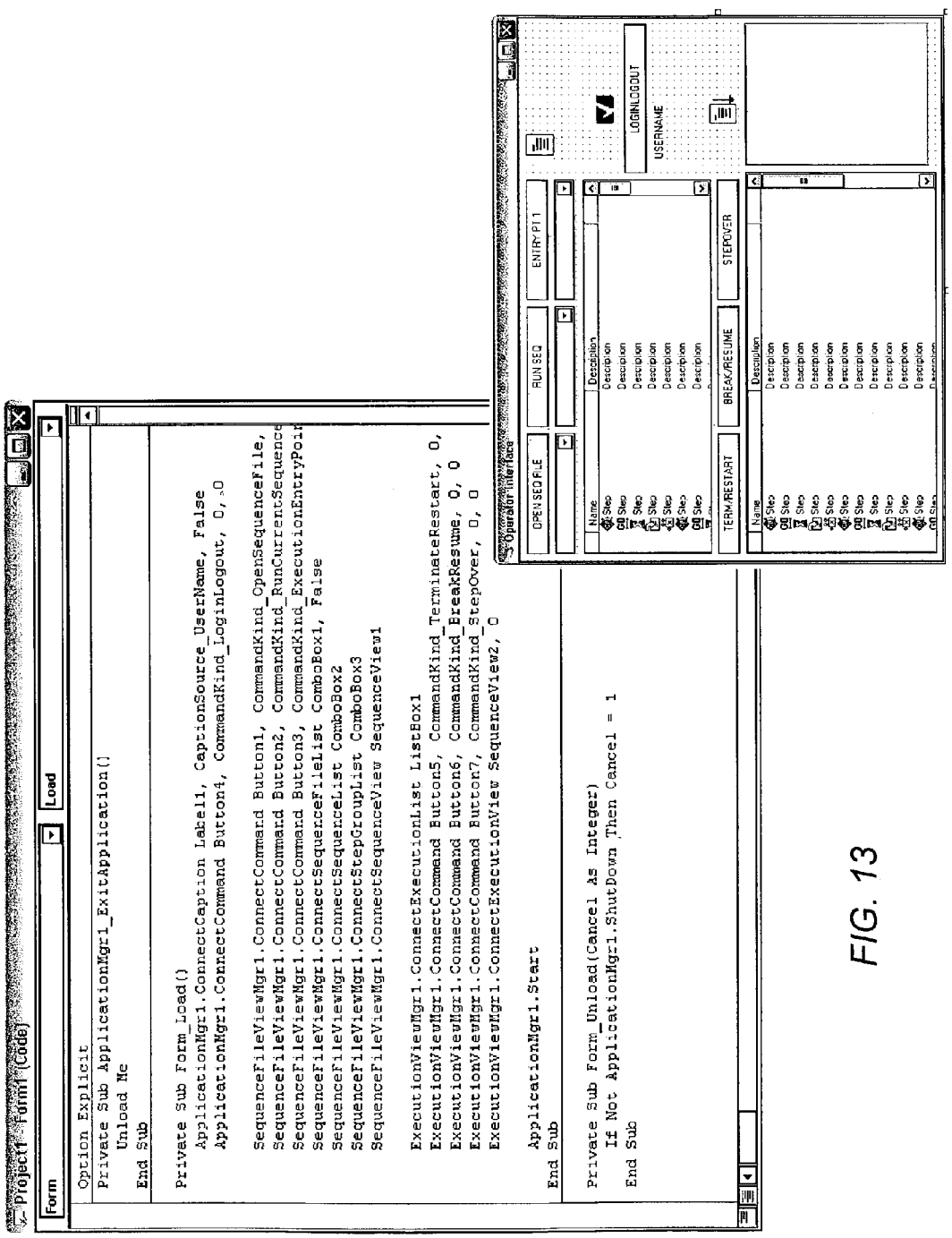
FIGS. 13–20 are screen shots illustrating use of "connections" in operator control interfaces according to one embodiment of the invention.

FIG. 13 illustrates operation where a user drops controls on a form and writes code. The code displayed in FIG. 13 most comprises "connections" to Manager software components. In other words, the code in FIG. 13 comprises connections between GUI elements in the operator interface and various Manager software components. The Managers handle the tedious work of user interface (UI) maintenance. The user can add his/her "connection" code anywhere in the program being created, as desired. The "connections" created by the code in FIG. 13 implements a fairly large amount of functionality with a relatively small amount of code. In general, the "connections" created by the code in FIG. 13 cause the respective "connected" manager components to automatically (i.e., programmatically) perform operations, based on user input to respective "connected" GUI elements, that normally the user would be required to hand code. Without this "connections" ability, the user would be required to write a much greater amount of code to accomplish the same functionality.

Figure 14:
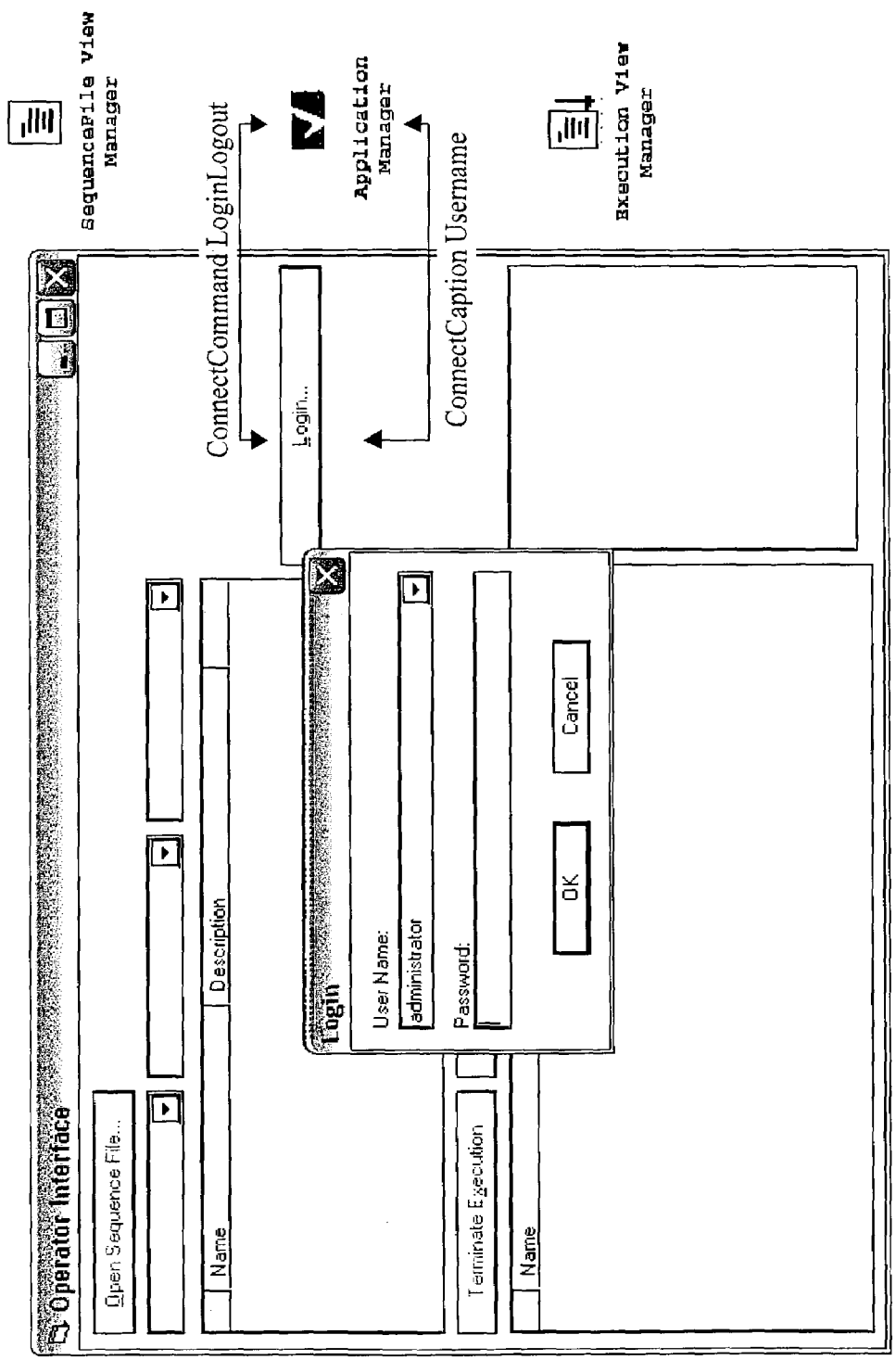

FIG. 14 illustrates an operator interface. As shown, the Login button is "connected" to the Application Manager. When the user provides input to the Login/Logout button, the Application Manager executes to update the appearance of the Login/Logout button and the user name shown. It is noted that a user is not logged in, and thus the operator interface window is "greyed out" and the user name caption is empty. The Login application is running (login prompt is displayed), and thus the Login button is disabled.

Figure 15:
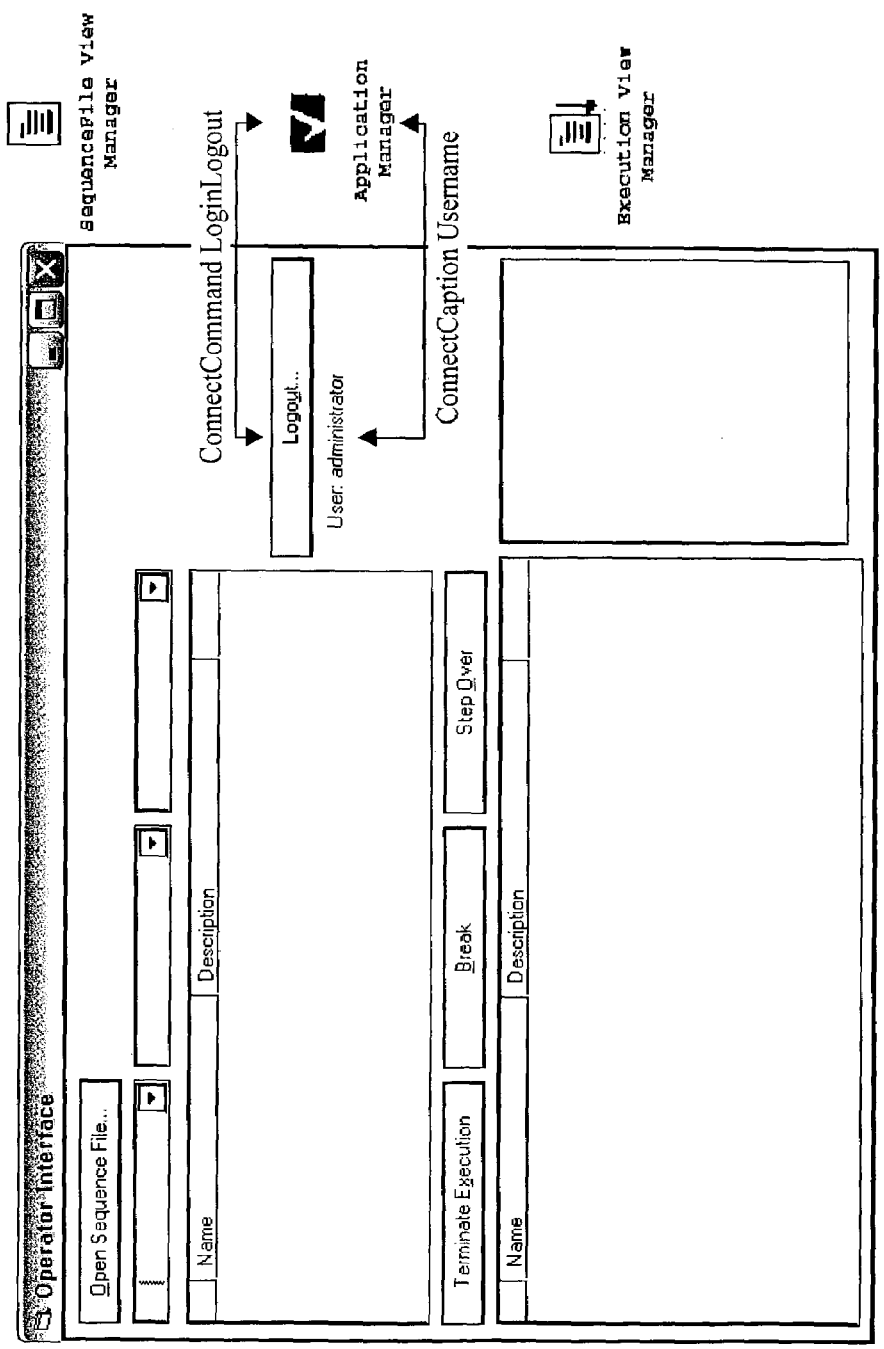

FIG. 15 illustrates the operator interface of FIG. 14 where the user has logged in. When the user logs in, the Application Manager automatically changes the Login button to "Logout" and displays the caption with the appropriate username.

Figure 16:
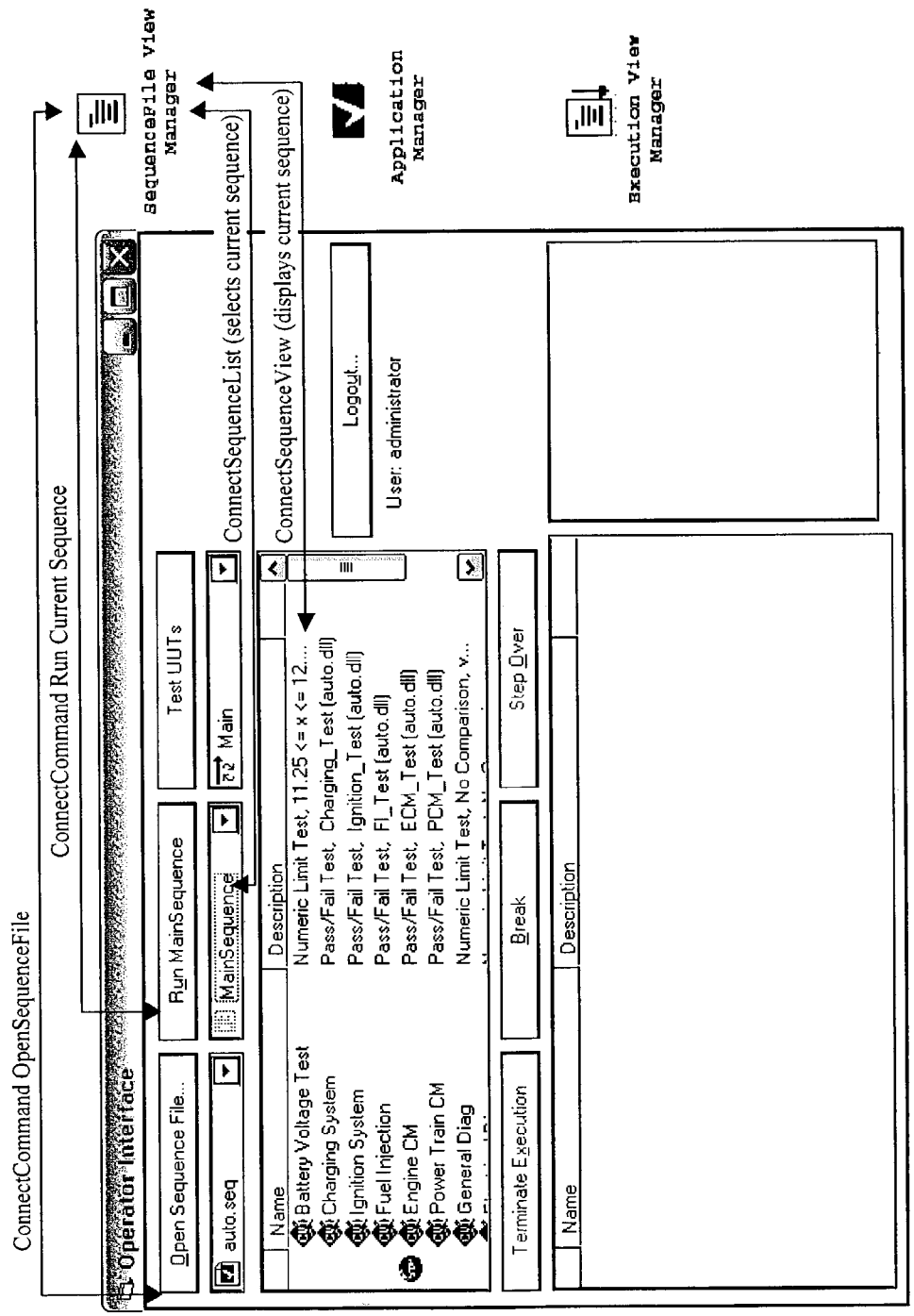

FIG. 16 is a screen shot illustrating use of the operator interface. As shown, the Open Sequence File button and the Run MainSequence button are "connected" to the SequenceFile View Manager. The Sequnce List list box is also "connected" to the SequenceFile View Manager. When the user provides input to either the Open Sequence File or the Run MainSequence buttons, or to the Sequence List box, the SequenceFile View Manager may automatically perform various operations, such as adjusting the information displayed in the Sequence View window. The Open Sequence File button opens a sequence file and selects it into the SequenceFile View Manager. MainSequence is the current sequence. Hence the RunCurrentSequenceCommand shows "Run MainSequence".

Figure 17:
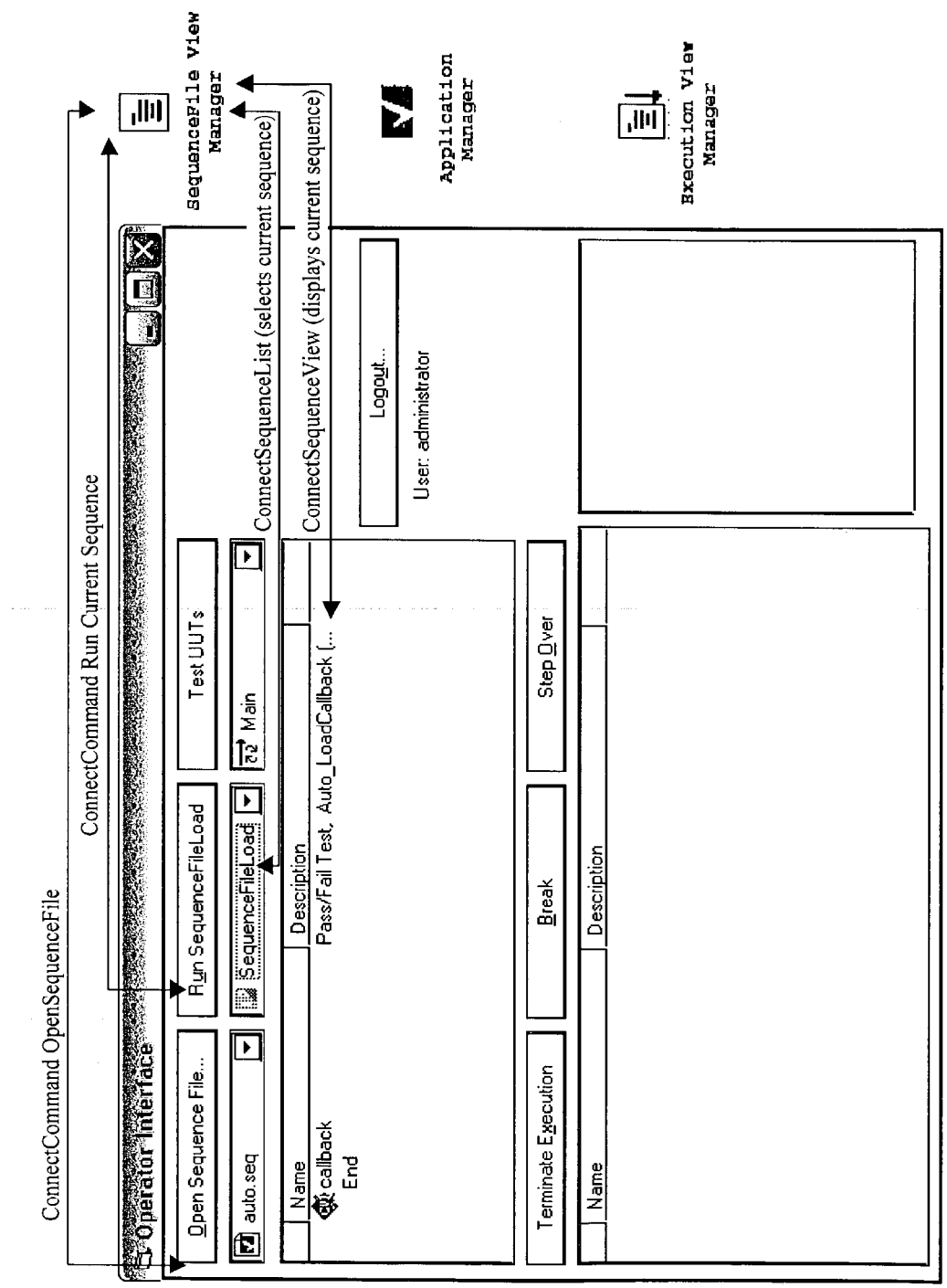

FIG. 17 is a screen shot illustrating the operator interface where the user has used the Run SequenceFileLoad button change the sequence to another sequence. When the user uses the Run SequenceFileLoad button to change the sequence, the SequenceFile View Manager operates to automatically adjust the information in the Sequence View window accordingly. As shown, the SequenceFile View Manager operates to automatically update the appearance of the Run SequenceFileLoad button and Sequence View window.

Figure 18:
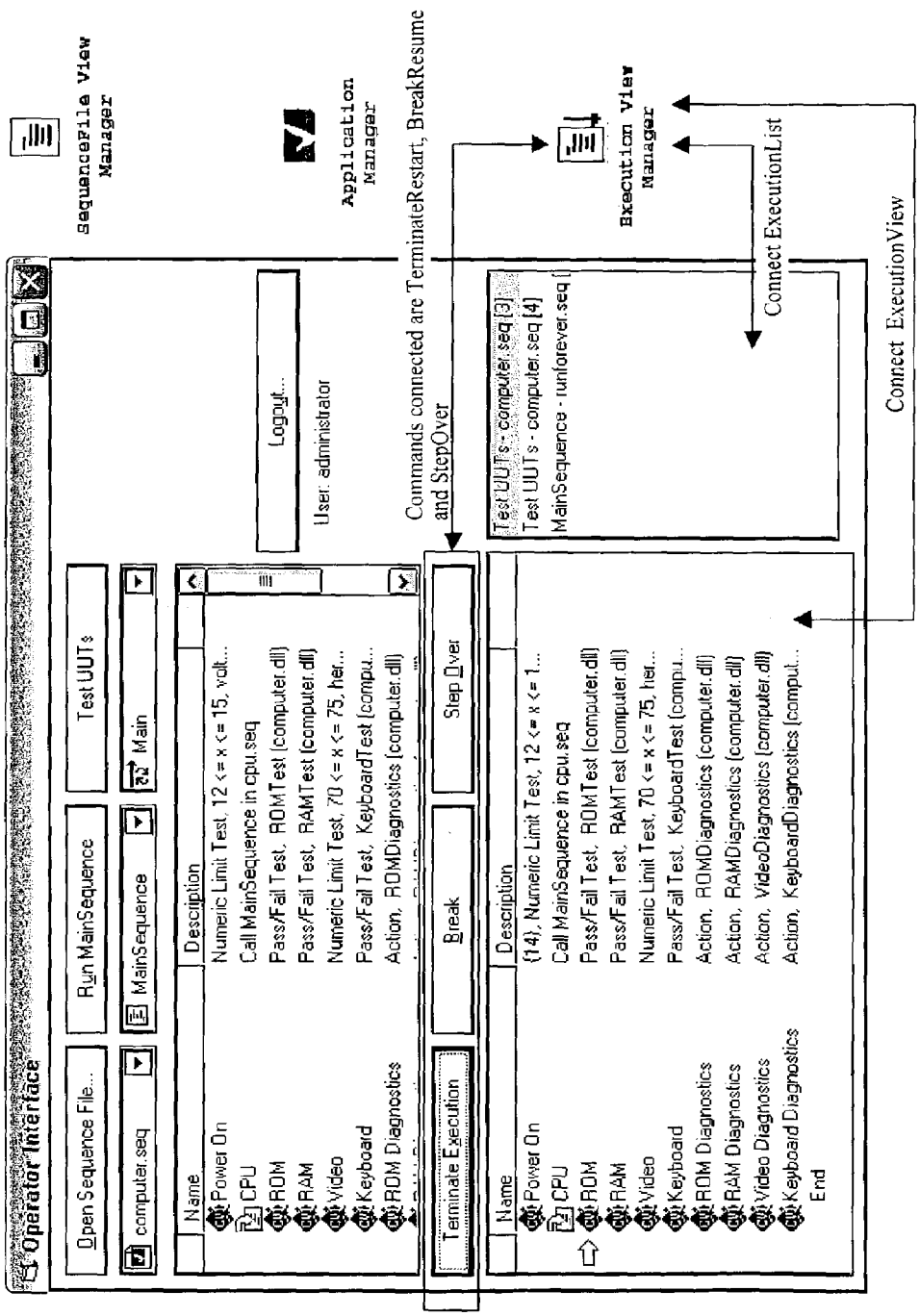

FIG. 18 is a screen shot illustrating execution functions of the operator interface. In FIG. 18, the Terminate/Restart, Break/Resume and Step Over buttons are connected to the Execution View Manager. When the user provides input to (e.g., presses) either of the Terminate/Restart, Break/Resume and Step Over buttons, the Execution View Manager may execute to update one or more of the Execution View window or Execution List window, as needed, and also updates the appearance of the respective buttons. In FIG. 18 the user has created a few executions using RunMainSequence and Test UUTs on the loaded Sequence Files. The execution list is populated with the created executions. The execution showing is the selected one "TestUUTs—computer.seq [3]". Since the sequence is running the TerminateRestart button shows "Terminate" as a caption because the user can terminate a running execution. Similarly because the execution is running, the user can "break" but cannot "step over" (the user need to pause the sequence to be able to step over).

Figure 19:
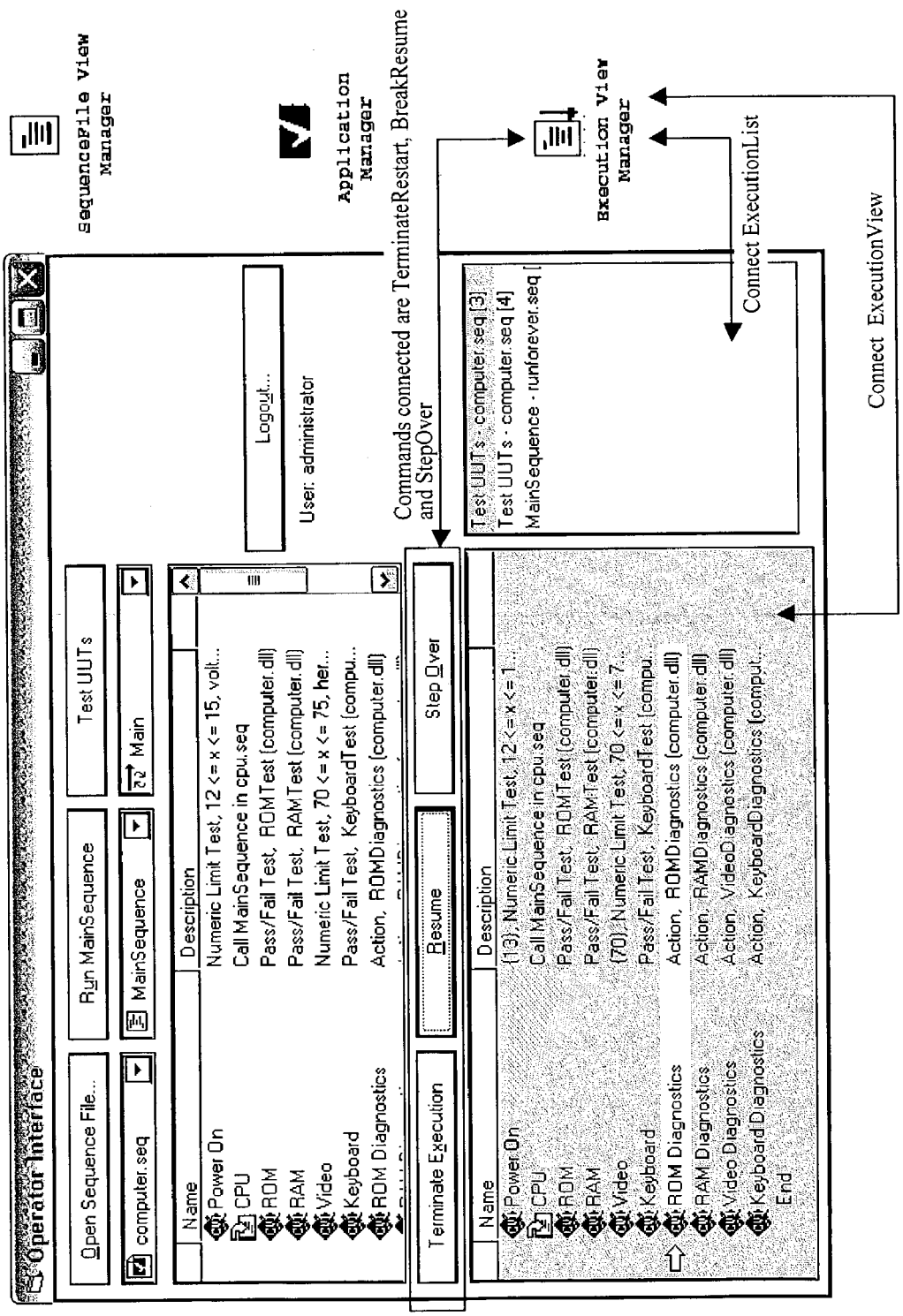

In FIG. 19, the user has pressed or selected the "Break" button (shown in FIG. 18) to pause the execution. When the user presses the "Break" button, the Execution View Manager executes to change the appearance of the Break button into the Resume button and executes to enable the StepOver feature.

Figure 20:
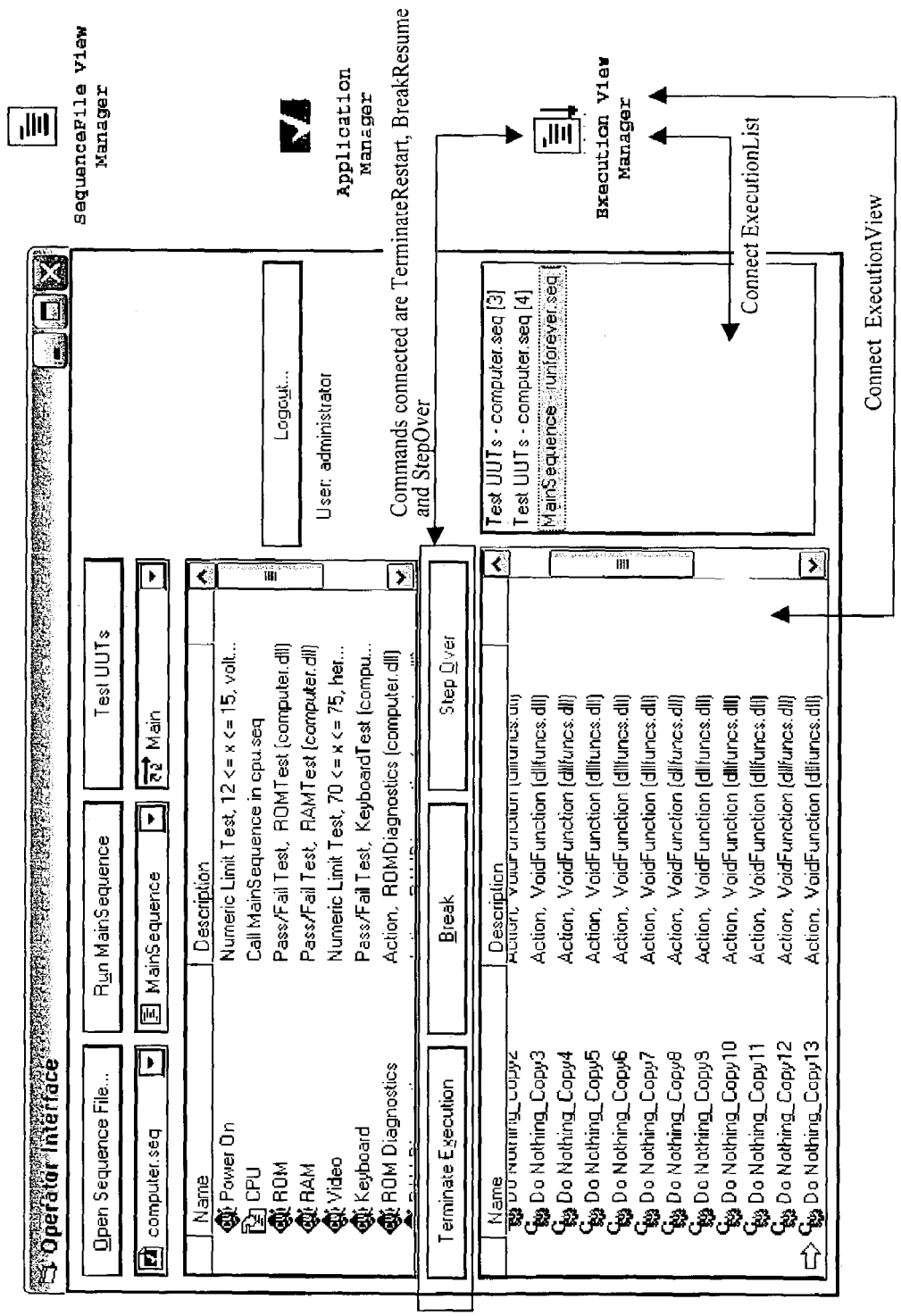

In FIG. 20, the user has changed the execution in the Execution List from "Test UUTs—computer seq [3]" to "MainSequence—runforever.seq". As shown, when the user switches executions in the Execution List window, the Execution View Manager executes to change the current sequence in the Execution View window. The Execution View Manager also updates the Buttons reflect the state of this running execution.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A computer-implemented method for creating a runtime operator interface application for a test executive sequence, the method comprising:

displaying a graphical user interface that provides access to a plurality of operator interface controls, wherein each operator interface control has associated functionality for one or more of managing execution of the test executive sequence and/or displaying information regarding execution of the test executive sequence;

including one or more of the operator interface controls in the run-time operator interface application in response to user input to the graphical user interface, wherein the one or more operator interface controls are operable to perform one or more of managing execution of the test executive sequence and/or displaying information regarding execution of the test executive sequence during execution of the run-time operator interface application; and storing one or more files representing the run-time operator interface application.

2. The method of claim 1, wherein each operator interface control includes associated program instructions operable to perform one or more of managing execution of the test executive sequence and/or displaying information regarding execution of the test executive, sequence.

3. The method of claim 2, wherein the program instructions associated with each operator interface control comprise pre-existing program instructions.

4. The method of claim 1, wherein each operator interface control includes one or more associated methods operable to perform one or more of managing execution of the test executive sequence and/or displaying information regarding execution of the test executive sequence.

5. The method of claim 1, further comprising:

deploying the plurality of operator interface controls on a first computer system;

wherein said displaying the graphical user interface comprises displaying a graphical user interface of an application development environment on the first computer system, wherein the graphical user interface of the application development environment provides access to the plurality of operator interface controls.

6. The method of claim 1, further comprising:

wherein the test executive sequence is associated with a first test executive application;

wherein the method further comprises installing the first test executive application on a first computer system, wherein said installing the first test executive application on the first computer system comprises installing the plurality of operator interface controls on the first computer system.

7. The method of claim 1, wherein the plurality of operator interface controls includes a first operator interface control;

wherein the first operator interface control is operable to respond to a first event during execution of the run-time operator interface application to perform one or more of managing execution of the test executive sequence and/or displaying information regarding execution of the test executive sequence.

8. The method of claim 1, further comprising:

configuring one or more of the one or more operator interface controls in response to user input;

wherein each of the one or more operator interface controls has one or more associated properties;

wherein, for each operator interface control, said configuring the operator interface control comprises receiving user input to configure one or more properties associated with the operator interface control.

9. The method of claim 8, wherein, for each operator interface control, said configuring the operator interface control further comprises displaying a property panel for configuring the operator interface control;

wherein said receiving user input to configure one or more properties associated with the operator interface control comprises receiving user input to the property panel.

10. The method of claim 1, wherein the test executive sequence is associated with a first test executive application;

wherein the plurality of operator interface controls includes a first operator interface control;

wherein the first operator interface control is operable to call the first test executive application during execution of the run-time operator interface application to perform one or more of managing execution of the test executive sequence and/or displaying information regarding execution of the test executive sequence.

11. The method of claim 1, wherein the plurality of operator interface controls includes a first operator interface control and a second operator interface control;

wherein the first operator interface control is aware of the second operator interface control.

12. The method of claim 1, wherein said including one or more of the operator interface controls in the run-time operator interface application includes including a first operator interface control and a second operator interface control in the run-time operator interface application;

wherein the first operator interface control is operable to affect the second operator interface control during execution of the run-time operator interface application.

13. The method of claim 12, wherein the first operator interface control is operable to cause the second operator interface control to display steps of the test executive sequence during execution of the run-time operator interface application.

14. The method of claim 1, further comprising:

executing the run-time operator interface application.

15. The method of claim 14, wherein said executing the run-time operator interface application comprises executing program instructions associated with one or more of the operator interface controls in the run-time operator interface application to perform one or more of managing execution of the test executive sequence and/or displaying information regarding execution of the test executive sequence.

16. The method of claim 14, wherein said executing the run-time operator interface application comprises executing program instructions associated with a first operator interface control in the run-time operator interface application;

wherein said executing the program instructions associated with the first operator interface control comprises selecting the test executive sequence in response to user input.

17. The method of claim 16, further comprising:

automatically displaying test executive steps of the test executive sequence in response to said selecting the test executive sequence.

18. The method of claim 16, further comprising:

invoking execution of the test executive sequence after said selecting the test executive sequence.

19. The method of claim 14,
wherein the test executive sequence is operable to perform one or more tests of a unit under test (UUT).

20. The method of claim 1,
wherein said including the one or more of the operator interface controls in the run-time operator interface application includes including a first operator interface control in the run-time operator interface application;
wherein the first operator interface control includes associated program instructions operable to automatically display test executive steps of the test executive sequence during execution of the run-time operator interface application.

21. The method of claim 20,
wherein the first operator interface control comprises a list control;
wherein said displaying the test executive steps of the test executive sequence comprises displaying the test executive steps as a list in the list control.

22. The method of claim 1,
wherein said including the one or more of the operator interface controls in the run-time operator interface application includes including a first operator interface control in the run-time operator interface application;
wherein the first operator interface control includes associated program instructions operable to invoke execution of the test executive sequence during execution of the run-time operator interface application.

23. The method of claim 22,
wherein said including the one or more of the operator interface controls in the run-time operator interface application further includes including a second operator interface control in the run-time operator interface application;
wherein the second operator interface control includes associated program instructions operable to stop execution of the test executive sequence during execution of the run-time operator interface application.

24. The method of claim 1,
wherein said including the one or more of the operator interface controls in the run-time operator interface application includes including a first operator interface control in the run-time operator interface application;
wherein the first operator interface control includes associated program instructions operable to automatically display an execution hierarchy for the test executive sequence during execution of the run-time operator interface application.

25. The method of claim 1,
wherein said including the one or more of the operator interface controls in the run-time operator interface application includes including a first operator interface control in the run-time operator interface application;
wherein the first operator interface control includes associated program instructions operable to automatically display a report generated in response to executing the test executive sequence.

26. The method of claim 1,
wherein said including the one or more of the operator interface controls in the run-time operator interface application includes including a first operator, interface control in the run-time operator interface application;
wherein the first operator interface control includes associated program instructions operable to automatically display execution results generated by execution of the test executive sequence.

27. The method of claim 1,
wherein said including the one or more of the operator interface controls in the run-time operator interface application includes including a first operator interface control in the run-time operator interface application;
wherein the first operator interface control includes associated program instructions operable to select the test executive sequence during execution of the run-time operator interface application.

28. The method of claim 27,
wherein said including the one or more of the operator interface controls in the run-time operator interface application further includes including a second operator interface control in the run-time operator interface application;
wherein the second operator interface control includes associated program instructions operable to display steps of the test executive sequence in response to said program instructions associated with the first operator interface control selecting the test executive sequence.

29. The method of claim 1,
wherein said including the one or more operator interface controls in the run-time operator interface application comprises including the one or more operator interface controls in a user interface for the run-time operator interface application.

30. The method of claim 1,
wherein one or more of the operator interface controls included in the run-time operator interface application have user interfaces displayable during execution of the run-time operator interface application.

31. The method of claim 1,
wherein the run-time operator interface application comprises a graphical program;
wherein said including the one or more of the operator interface controls in the run-time operator interface application comprises including the one or more of the operator interface controls in the graphical program.

32. The method of claim 1,
wherein the plurality of operator interface controls comprises a plurality of ActiveX controls.

33. A computer-implemented method for creating a run-time operator interface application for a first test executive sequence, the method comprising:
installing a test executive application on a first computer system;
installing a plurality of operator interface controls on the first computer system, wherein each operator interface control has associated functionality for one or more of managing execution of a test executive sequence and/or displaying information regarding execution of a test executive sequence;
installing an application development environment application on the first computer system;
creating the first test executive sequence using the test executive application; and
creating the run-time operator interface application using the application development environment application, wherein said creating the run-time operator interface application includes including one or more of the operator interface controls in the run-time operator interface application.

34. The method of claim 33,
wherein the one or more operator interface controls included in the run-time operator interface application are operable to perform one or more of managing execution of the first test executive sequence and/or displaying information regarding execution of the first test executive sequence during execution of the run-time operator interface application.

35. The method of claim 33,
wherein said installing the test executive application on the first computer system includes performing said installing the plurality of operator interface controls on the first computer system.

36. A computer-implemented method for displaying a test executive sequence, wherein the test executive sequence includes a plurality of test executive steps, the method comprising:
including a first control in the run-time operator interface application in response to user input, wherein the first control includes associated program instructions operable to automatically display the plurality of test executive steps in the test executive sequence during execution of the run-time operator interface application;
executing the run-time operator interface application, wherein said executing the run-time operator interface application includes executing the program instructions associated with the first control; and
displaying the plurality of test executive steps in the test executive sequence in a user interface of the first control.

37. The method of claim 36,
wherein the program instructions associated with the first control comprise pre-existing program instructions.

38. The method of claim 36,
wherein the first control comprises a list control;
wherein said displaying the plurality of test executive steps in the test executive sequence in a user interface of the first control comprises displaying the plurality of test executive steps as a list in the list control.

39. A computer accessible memory medium that stores program instructions for creating a run-time operator interface application for a test executive sequence, wherein the program instructions are executable by a processor to perform:
displaying a graphical user interface that provides access to a plurality of operator interface controls, wherein each operator interface control has associated functionality for one or more of managing execution of the test executive sequence and/or displaying information regarding execution of the test executive sequence;
including one or more of the operator interface controls in the runtime operator interface application in response to user input to the graphical user interface, wherein the one or more operator interface controls are operable to perform one or more of managing execution of the test executive sequence and/or displaying information regarding execution of the test executive sequence during execution of the run-time operator interface application; and
storing one or more files representing the run-time operator interface application.

40. The memory medium of claim 39, wherein each operator interface control includes associated program instructions operable to perform one or more of managing execution of the test executive sequence and/or displaying information regarding execution of the test executive sequence.

41. The memory medium of claim 39, wherein the program instructions are further executable to perform:
deploying the plurality of operator interface controls on a first computer system;
wherein said displaying the graphical user interface comprises displaying a graphical user interface of an application development environment on the first computer system, wherein the graphical user interface of the application development environment provides access to the plurality of operator interface controls.

42. The memory medium of claim 39, wherein the test executive sequence is associated with a first test executive application, and wherein the program instructions are further executable to perform:
installing the first test executive application on a first computer system, wherein said installing the first test executive application on the first computer system comprises installing the plurality of operator interface controls on the first computer system.

43. The memory medium of claim 39,
wherein the plurality of operator interface controls includes a first operator interface control; and
wherein the first operator interface control is operable to respond to a first event during execution of the run-time operator interface application to perform one or more of managing execution of the test executive sequence and/or displaying information regarding execution of the test executive sequence.

44. The memory medium of claim 39, wherein the program instructions are further executable to perform:
configuring one or more of the one or more operator interface controls in response to user input;
wherein each of the one or more operator interface controls has one or more associated properties; and
wherein, for each operator interface control, said configuring the operator interface control comprises receiving user input to configure one or more properties associated with the operator interface control.

45. The memory medium of claim 39,
wherein the test executive sequence is associated with a first test executive application;
wherein the plurality of operator interface controls includes a first operator interface control; and
wherein the first operator interface control is operable to call the first test executive application during execution of the run-time operator interface application to perform one or more of managing execution of the test executive sequence and/or displaying information regarding execution of the test executive sequence.

46. The memory medium of claim 39,
wherein the plurality of operator interface controls includes a first operator interface control and a second operator interface control; and
wherein the first operator interface control is aware of the second operator interface control.

47. The memory medium of claim 39,
wherein said including one or more of the operator interface controls in the run-time operator interface application includes including a first operator interface control and a second operator interface control in the run-time operator interface application; and
wherein the first operator interface control is operable to affect the second operator interface control during execution of the run-time operator interface application.

48. The memory medium of claim 47,
wherein the first operator interface control is operable to cause the second operator interface control to display steps of the test executive sequence during execution of the run-time operator interface application.

49. The memory medium of claim 39, wherein the program instructions are further executable to perform:
executing the run-time operator interface application.

50. The memory medium of claim 49,
wherein said executing the run-time operator interface application comprises executing program instructions associated with a first operator interface control in the run-time operator interface application;
wherein said executing the program instructions associated with the first operator interface control comprises selecting the test executive sequence in response to user input.

51. The memory medium of claim 50, wherein the program instructions are further executable to perform one or more of:
automatically displaying test executive steps of the test executive sequence in response to said selecting the test executive sequence; or
invoking execution of the test executive sequence after said selecting the test executive sequence.

52. The memory medium of claim 39,
wherein said including the one or more of the operator interface controls in the run-time operator interface application includes including a first operator interface control in the run-time operator interface application; and
wherein the first operator interface control includes associated program instructions operable to automatically display test executive steps of the test executive sequence during execution of the run-time operator interface application.

53. The memory medium of claim 39,
wherein said including the one or more of the operator interface controls in the run-time operator interface application includes including a first operator interface control in the run-time operator interface application; and
wherein the first operator interface control includes associated program instructions operable to perform one or more of:
invoke execution of the test executive sequence during execution of the run-time operator interface application;
automatically display an execution hierarchy for the test executive sequence during execution of the run-time operator interface application;
automatically display a report generated in response to executing the test executive sequence;
automatically display execution results generated by execution of the test executive sequence; or
select the test executive sequence during execution of the run-time operator interface application.

54. The memory medium of claim 53,
wherein said including the one or more of the operator interface controls in the run-time operator interface application further includes including a second operator interface control in the run-time operator interface application; and
wherein the second operator interface control includes associated program instructions operable to perform one or more of:
stop execution of the test executive sequence during execution of the run-time operator interface application; or
display steps of the test executive sequence in response to said program instructions associated with the first operator interface control selecting the test executive sequence.

55. The memory medium of claim 39,
wherein said including the one or more operator interface controls in the run-time operator interface application comprises including the one or more operator interface controls in a user interface for the run-time operator interface application, and wherein one or more of the operator interface controls included in the run-time operator interface application have user interfaces displayable during execution of the run-time operator interface application.

56. The memory medium of claim 39,
wherein the run-time operator interface application comprises a graphical program; and
wherein said including the one or more of the operator interface controls in the run-time operator interface application comprises including the one or more of the operator interface controls in the graphical program.

57. The memory medium of claim 39,
wherein the plurality of operator interface controls comprises a plurality of ActiveX controls.

* * * * *

UNITED STATES PATENT AND TRADEMARK OFFICE
CERTIFICATE OF CORRECTION

PATENT NO.          : 7,143,361 B2                                          Page 1 of 1
APPLICATION NO. : 10/320036
DATED               : November 28, 2006
INVENTOR(S)      : Mahesh A. Ramchandani It is certified that error appears in the above-identified patent and that said Letters Patent is hereby corrected as shown below:

In the Claims:

Column 19 Line 21, please delete "test executive, sequence" and substitute -- test executive sequence --;

Column 21 Line 61, please delete "first operator, interface" and substitute -- first operator interface --.

Signed and Sealed this

Sixth Day of March, 2007

JON W. DUDAS
*Director of the United States Patent and Trademark Office*